(12) United States Patent
Whiting et al.

(10) Patent No.: US 11,724,422 B2
(45) Date of Patent: Aug. 15, 2023

(54) OPERATOR-ASSISTED SYSTEM AND METHOD FOR PREPARING A BLADDER FOR USE IN COMPOSITE STRINGER MANUFACTURING

(71) Applicant: The Boeing Company, Chicago, IL (US)

(72) Inventors: Robert W. Whiting, Rigby, ID (US); Darrell D. Jones, Mill Creek, WA (US); Paul Chace Wilcoxson, Kent, WA (US); Raviendra S. Suriyaarachchi, Daniel Island, SC (US)

(73) Assignee: The Boeing Company, Arlington, VA (US)

( * ) Notice: Subject to any disclaimer, the term of this patent is extended or adjusted under 35 U.S.C. 154(b) by 541 days.

(21) Appl. No.: 16/876,635

(22) Filed: May 18, 2020

(65) Prior Publication Data

US 2021/0354337 A1    Nov. 18, 2021

(51) Int. Cl.
| | |
|---|---|
| *B29C 33/50* | (2006.01) |
| *B29C 35/02* | (2006.01) |
| *B29C 65/00* | (2006.01) |
| *B64C 1/06* | (2006.01) |
| *B29L 31/30* | (2006.01) |

(52) U.S. Cl.
CPC ............ *B29C 33/505* (2013.01); *B29C 35/02* (2013.01); *B29C 66/634* (2013.01); *B64C 1/064* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 2006/0231981 A1 | 10/2006 | Lee | |
| 2013/0086873 A1 | 4/2013 | Bahr | |
| 2014/0299262 A1* | 10/2014 | Coxon | .................... B29C 70/32 156/194 |

FOREIGN PATENT DOCUMENTS

EP    2889127    1/2015

* cited by examiner

*Primary Examiner* — Christopher T Schatz

(57) ABSTRACT

A system for preparing a bladder for use in manufacturing a composite stringer includes a sock application station, a film application station, and a composite ply application station. The sock application station has a sock cartridge configured to progressively apply a breather sock of breather material in tubular form onto a bladder as the bladder exits the sock cartridge to thereby result in a sock-bladder assembly. The film application station is located downstream of the sock application station and is configured to inflate a film from a flat shape into an open film tube prior to application over the sock-bladder assembly to thereby result in a film-sock-bladder assembly. The composite ply application station is located downstream of the film application station and has a wrap ply forming bed containing at least one forming bed opening and configured to receive one or more wrap plies of a wrap laminate for urging into the forming bed opening by the film-sock-bladder assembly to produce a ply-film-sock-bladder assembly.

20 Claims, 23 Drawing Sheets

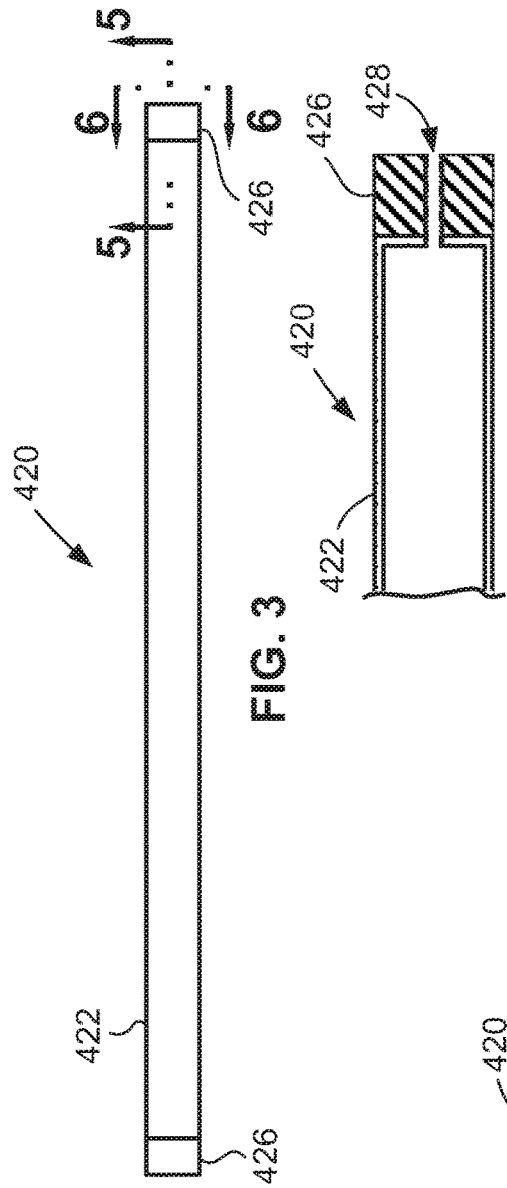
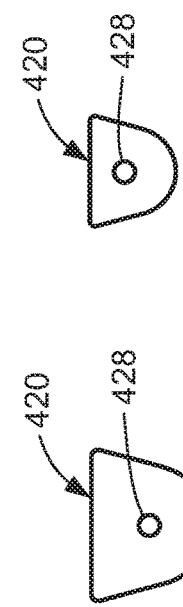
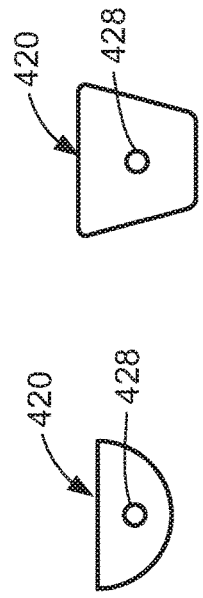
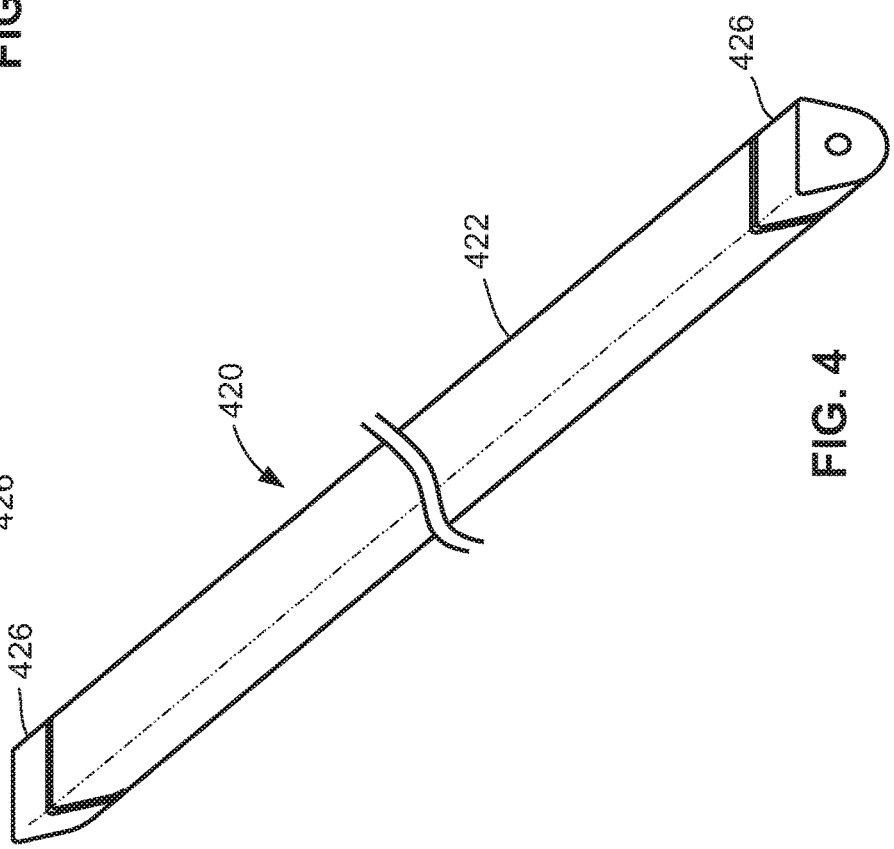
FIG. 3
FIG. 5
FIG. 6
FIG. 7
FIG. 8
FIG. 9
FIG. 4

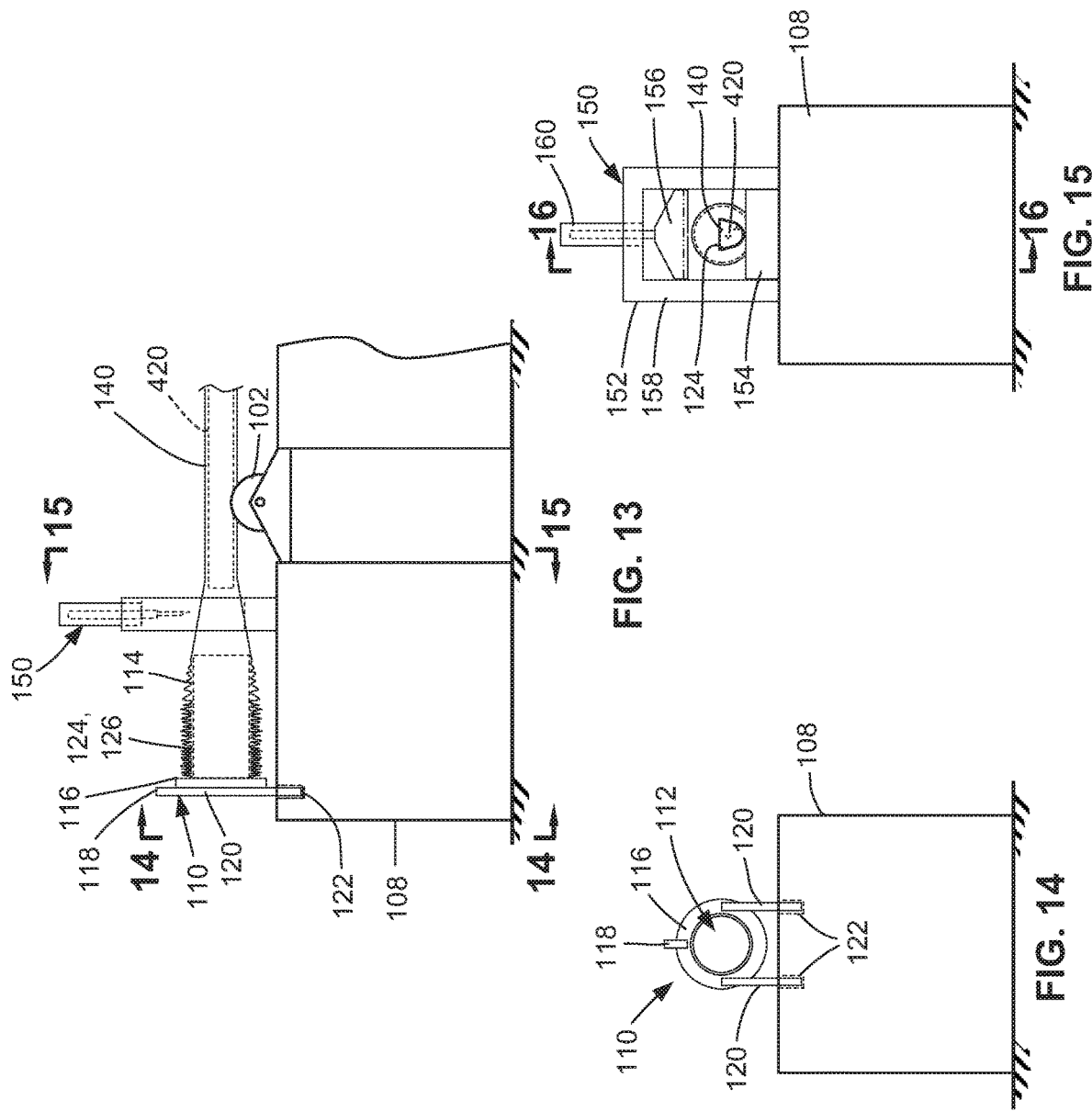

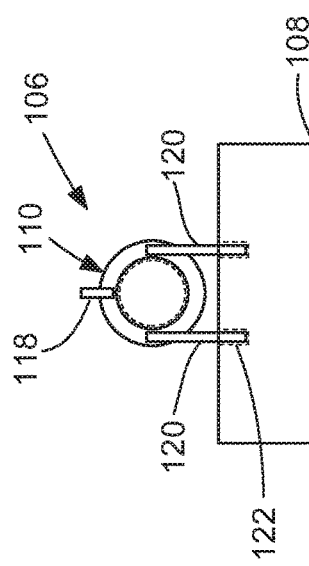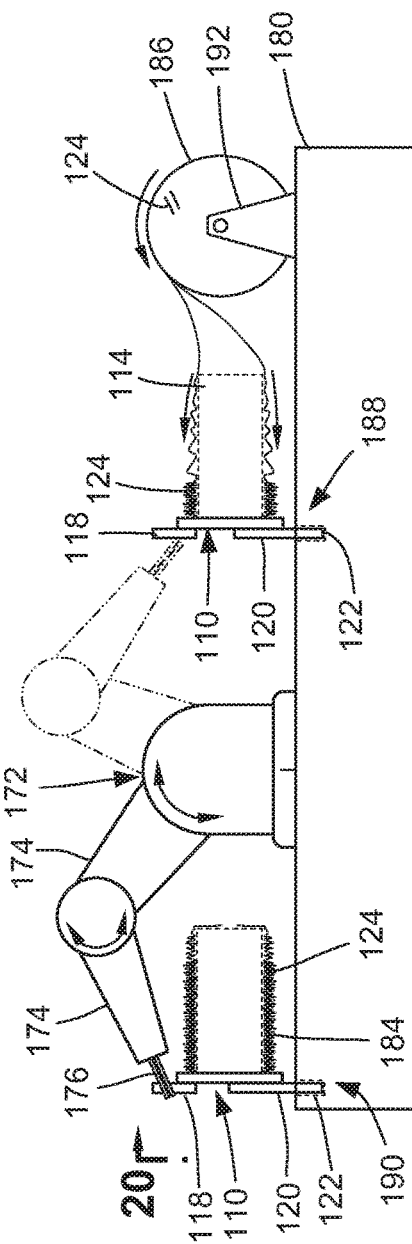

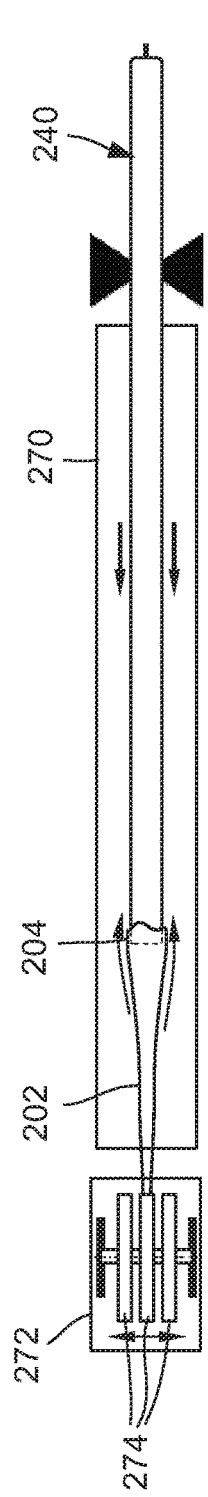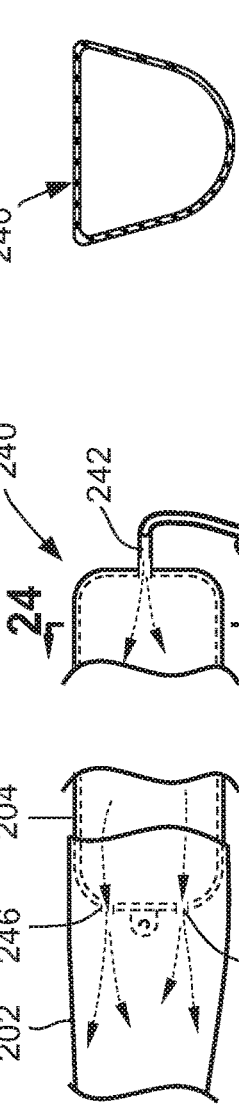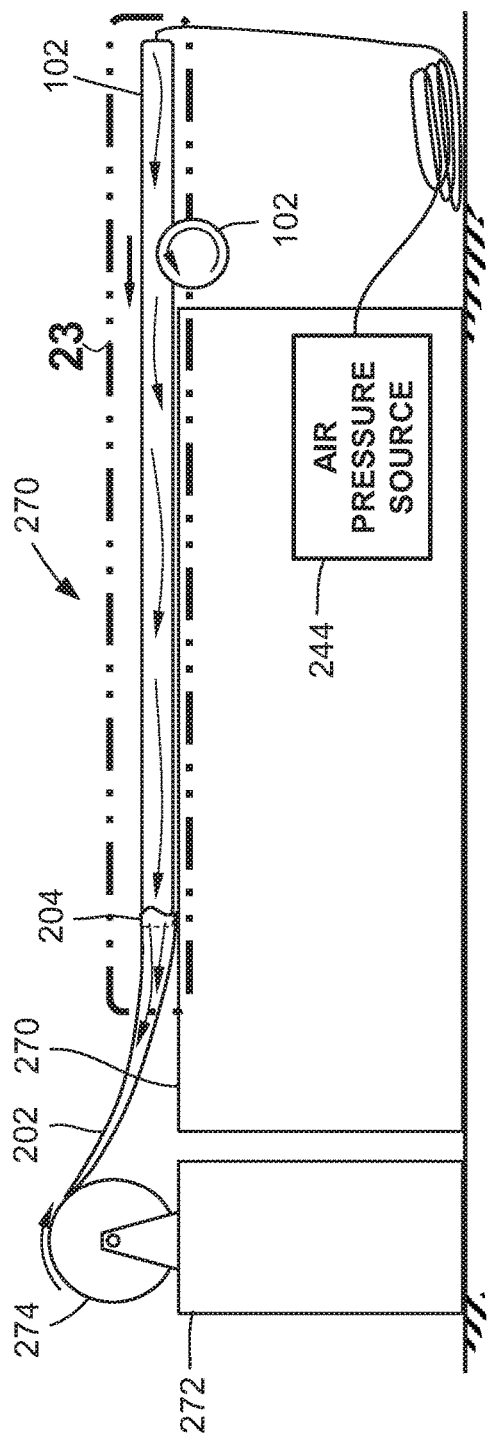

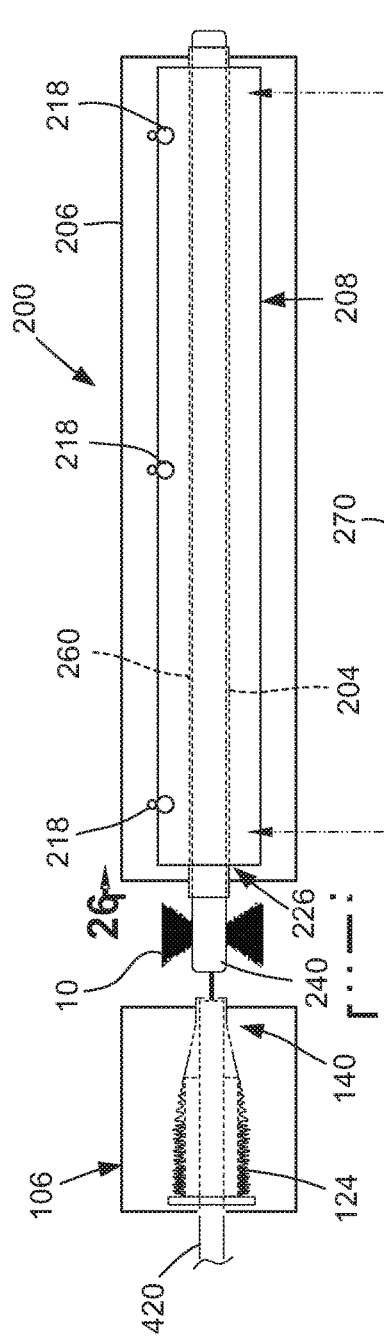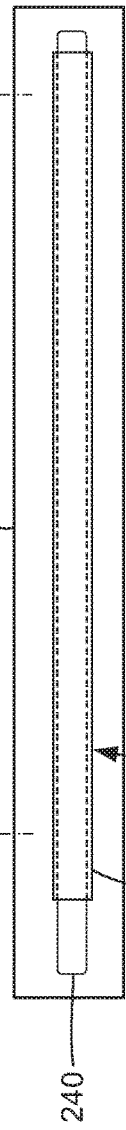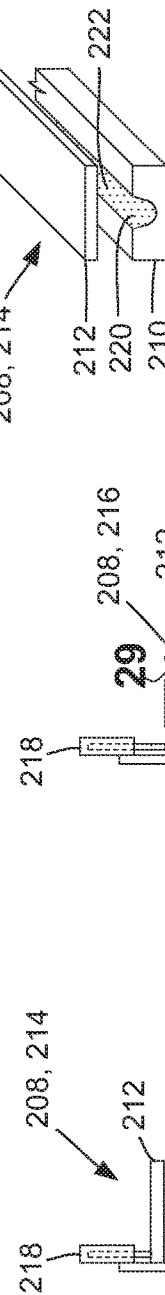

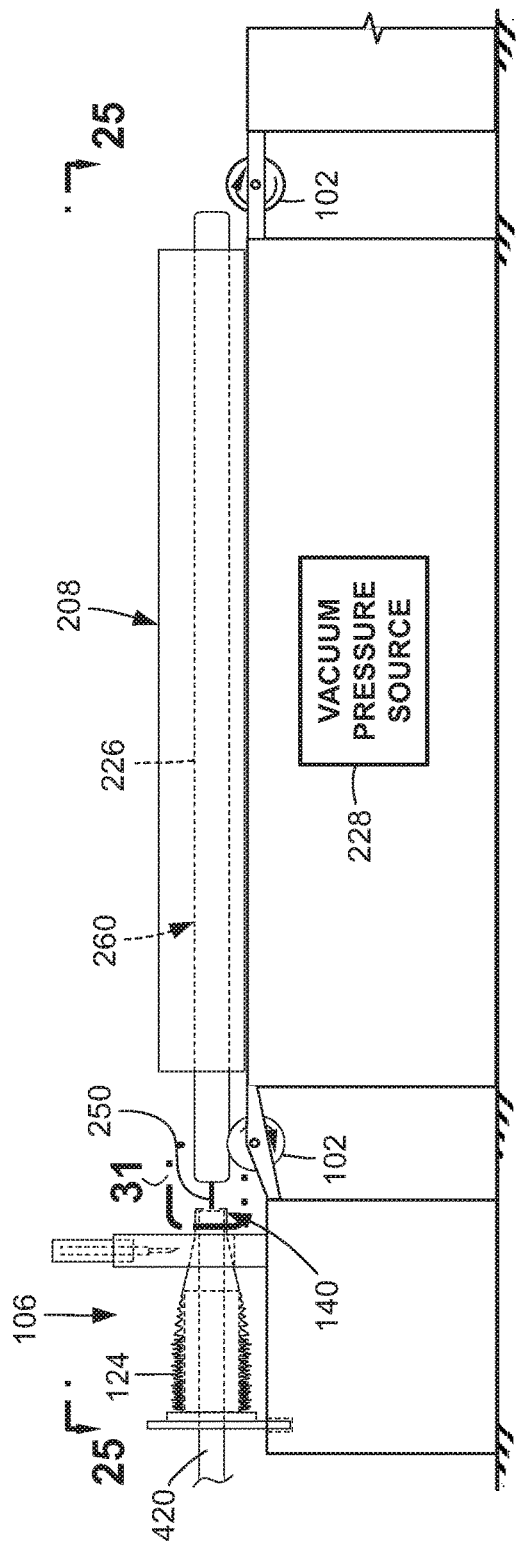
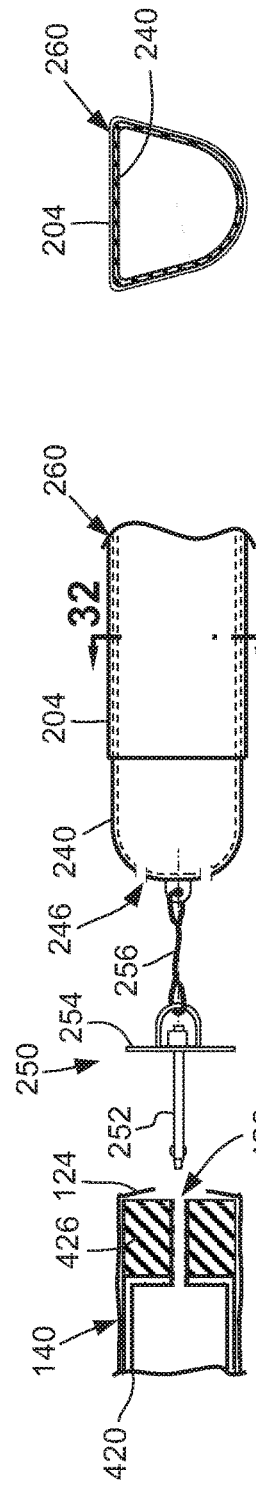
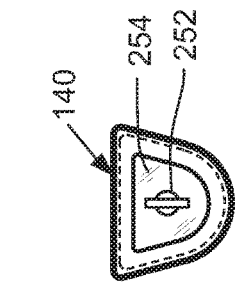
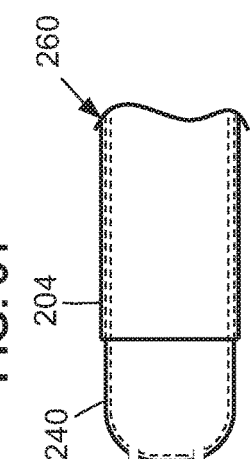
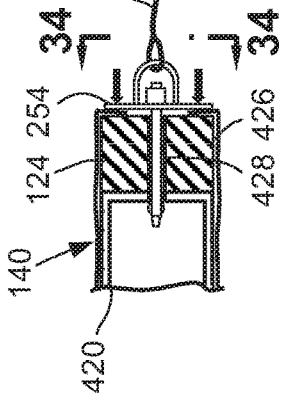

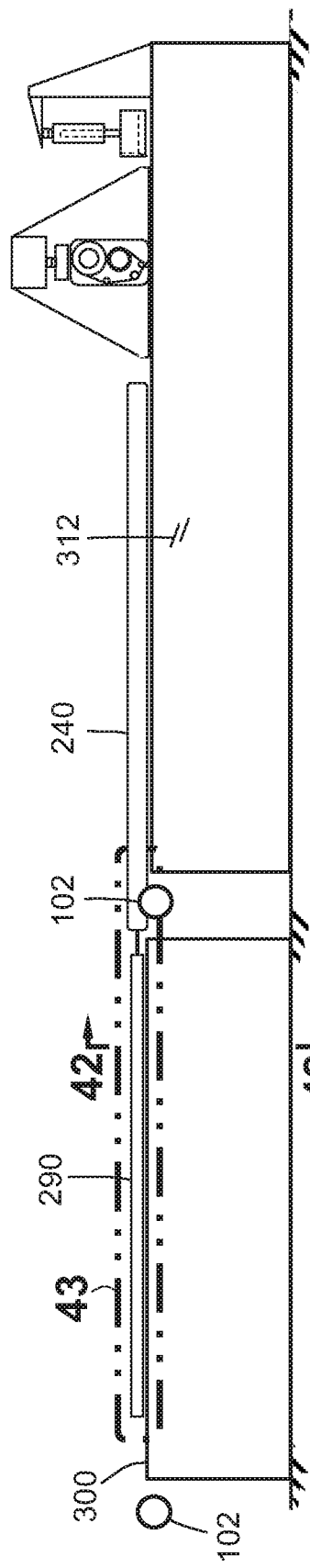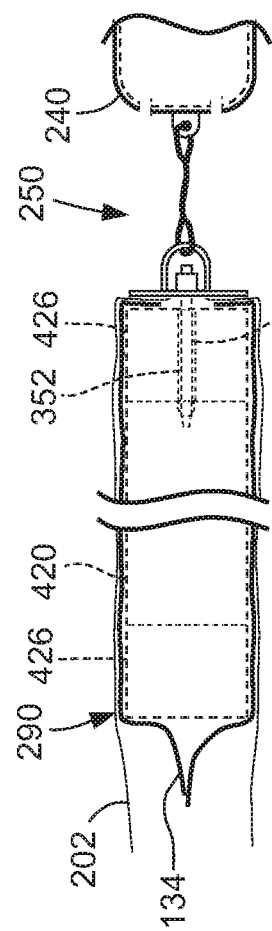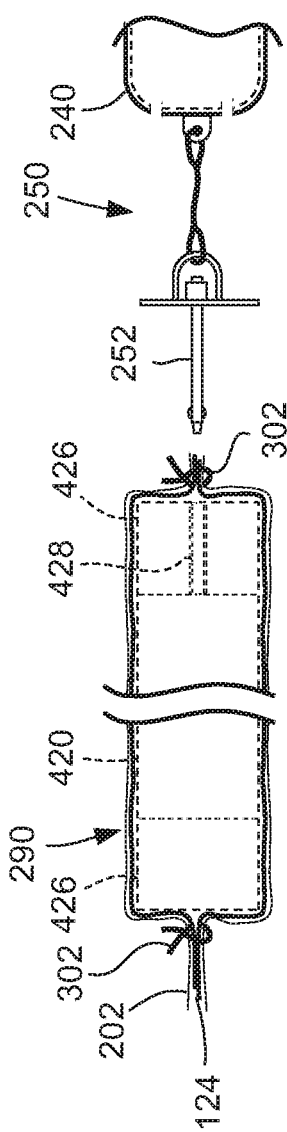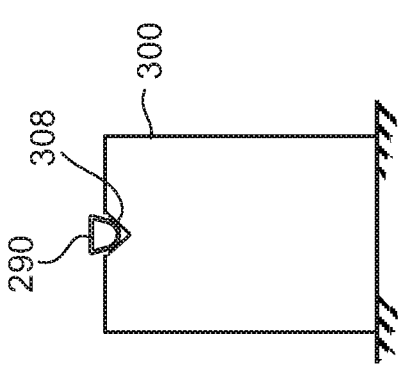

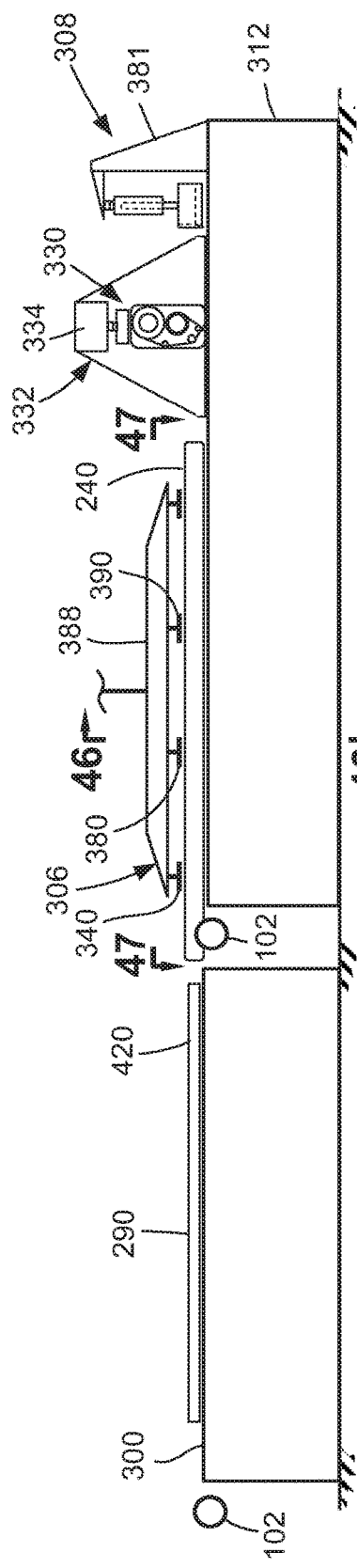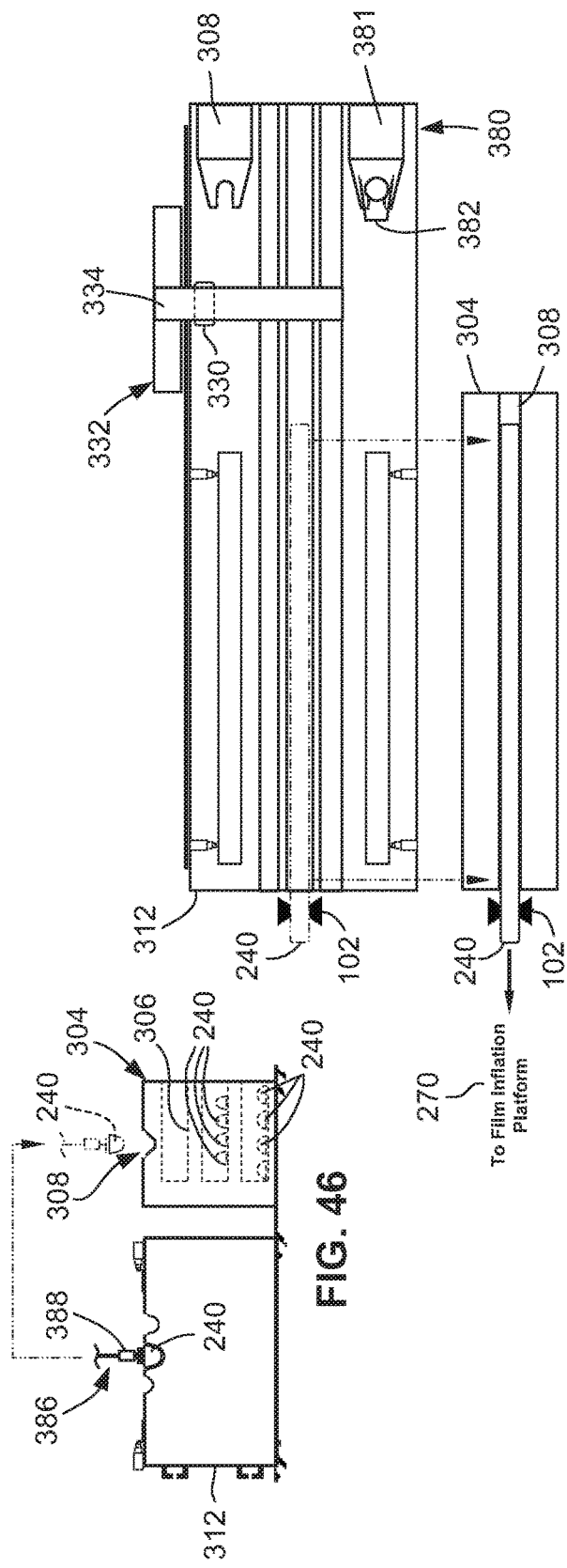

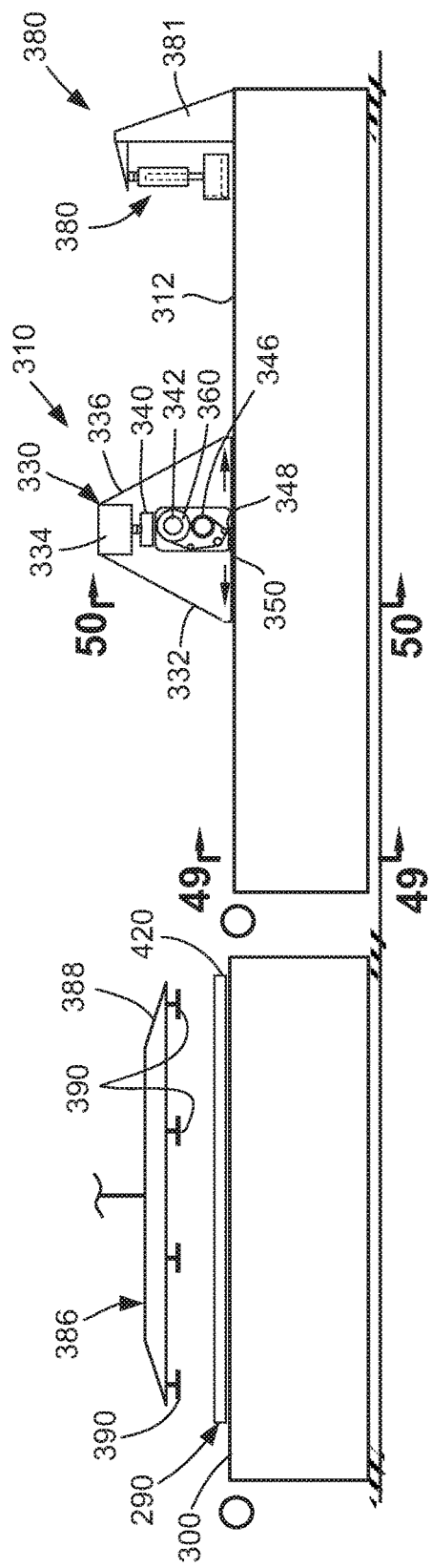
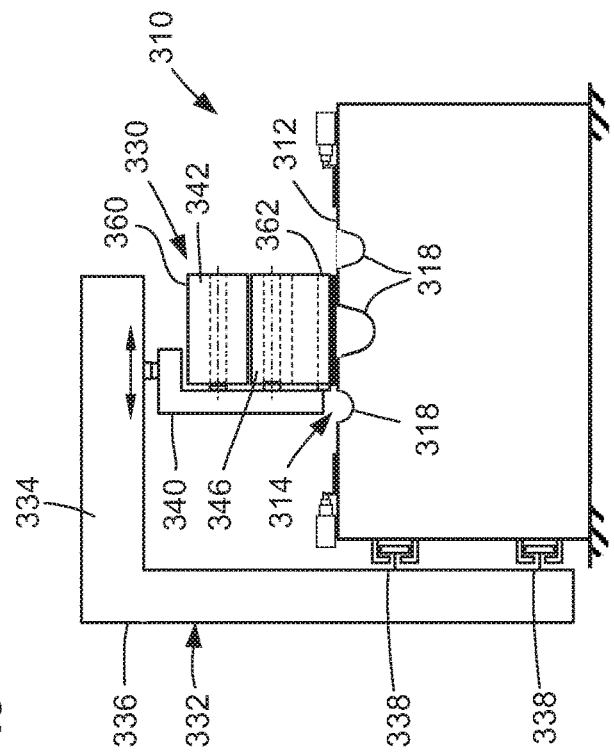
FIG. 48
FIG. 49
FIG. 50

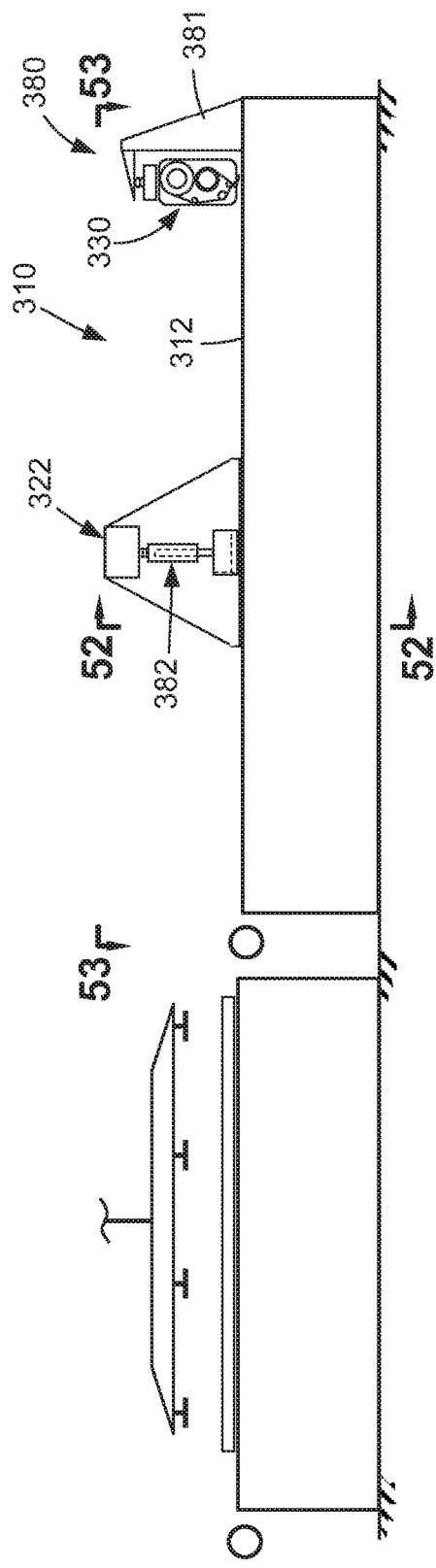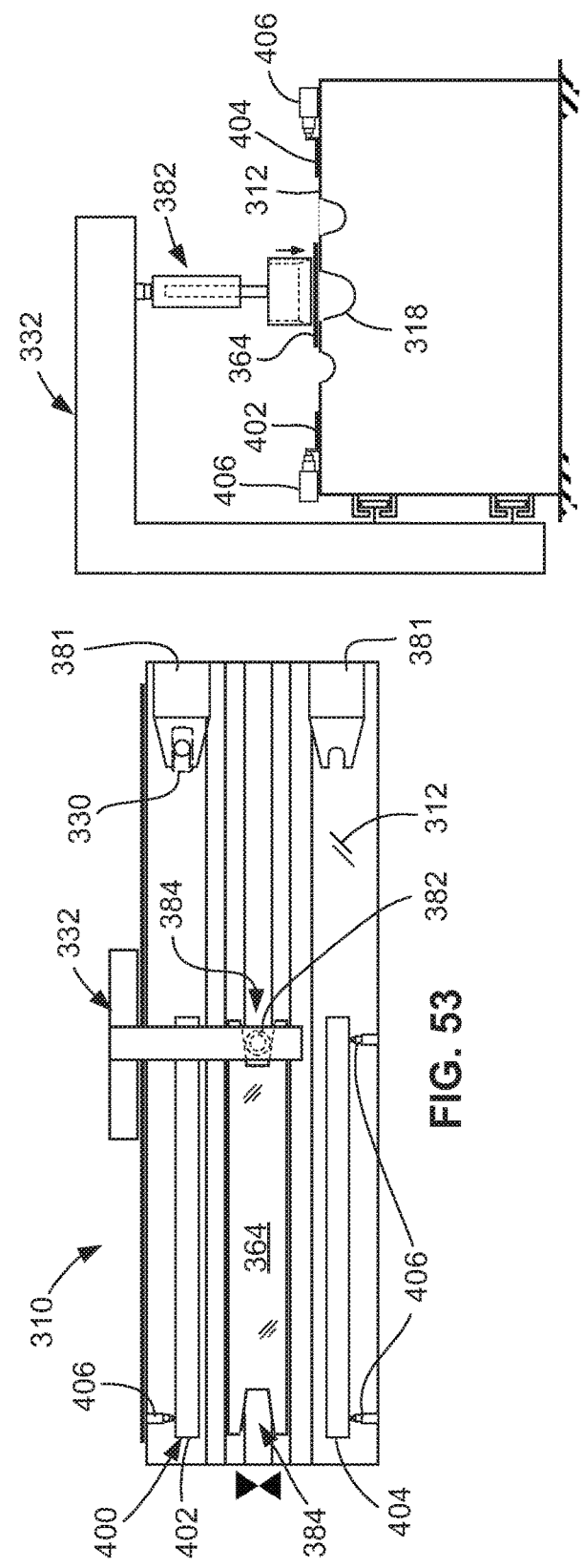

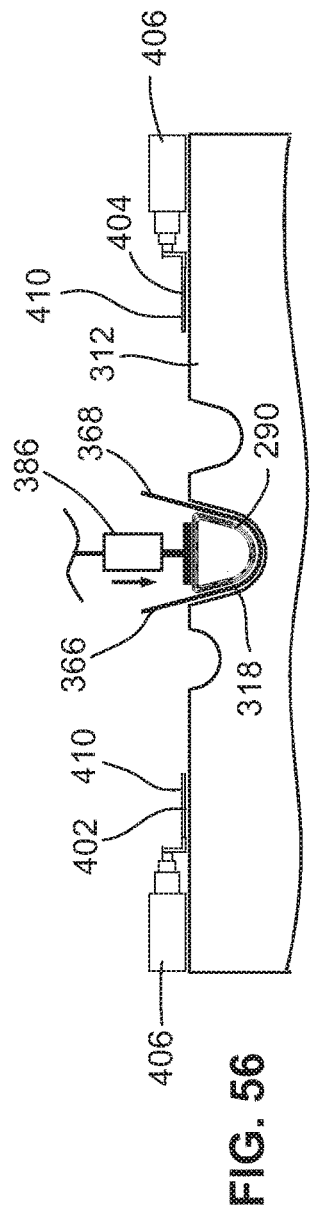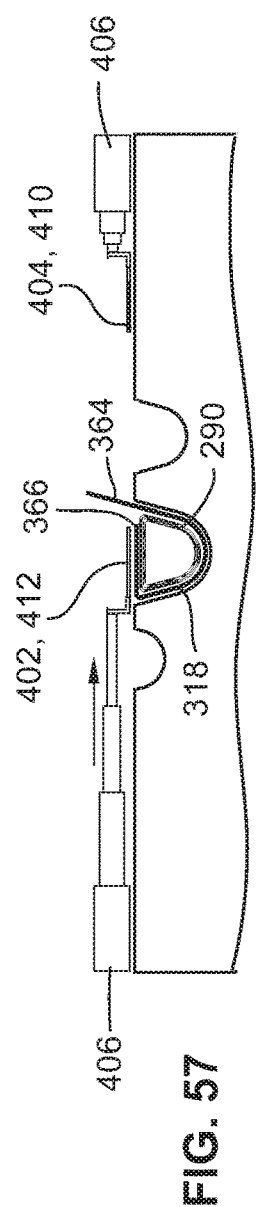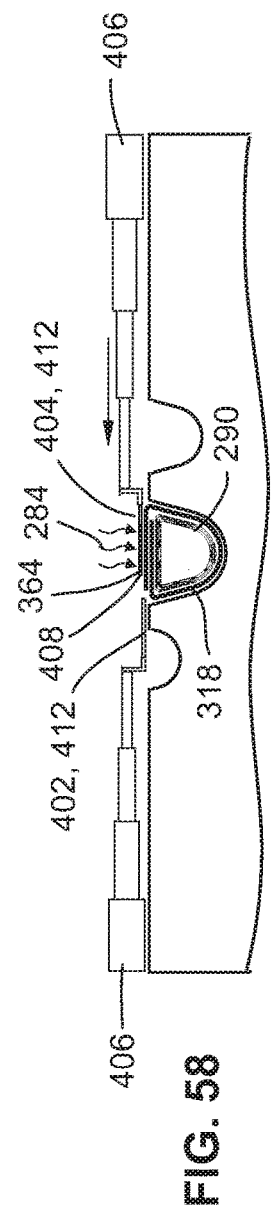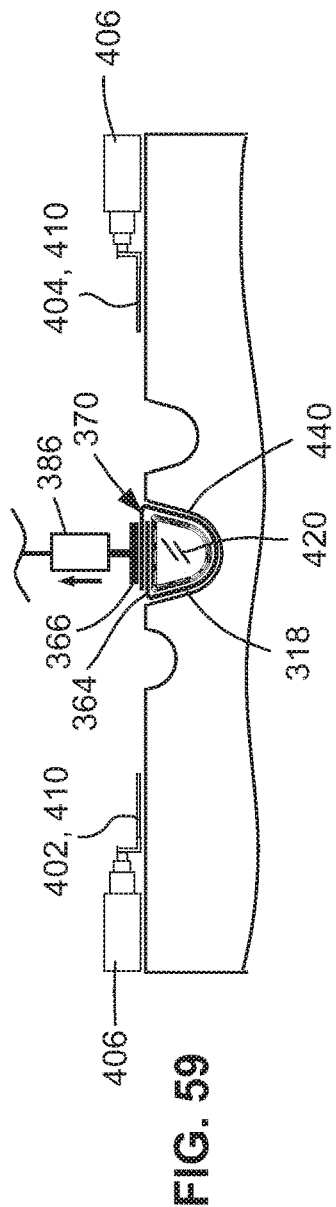

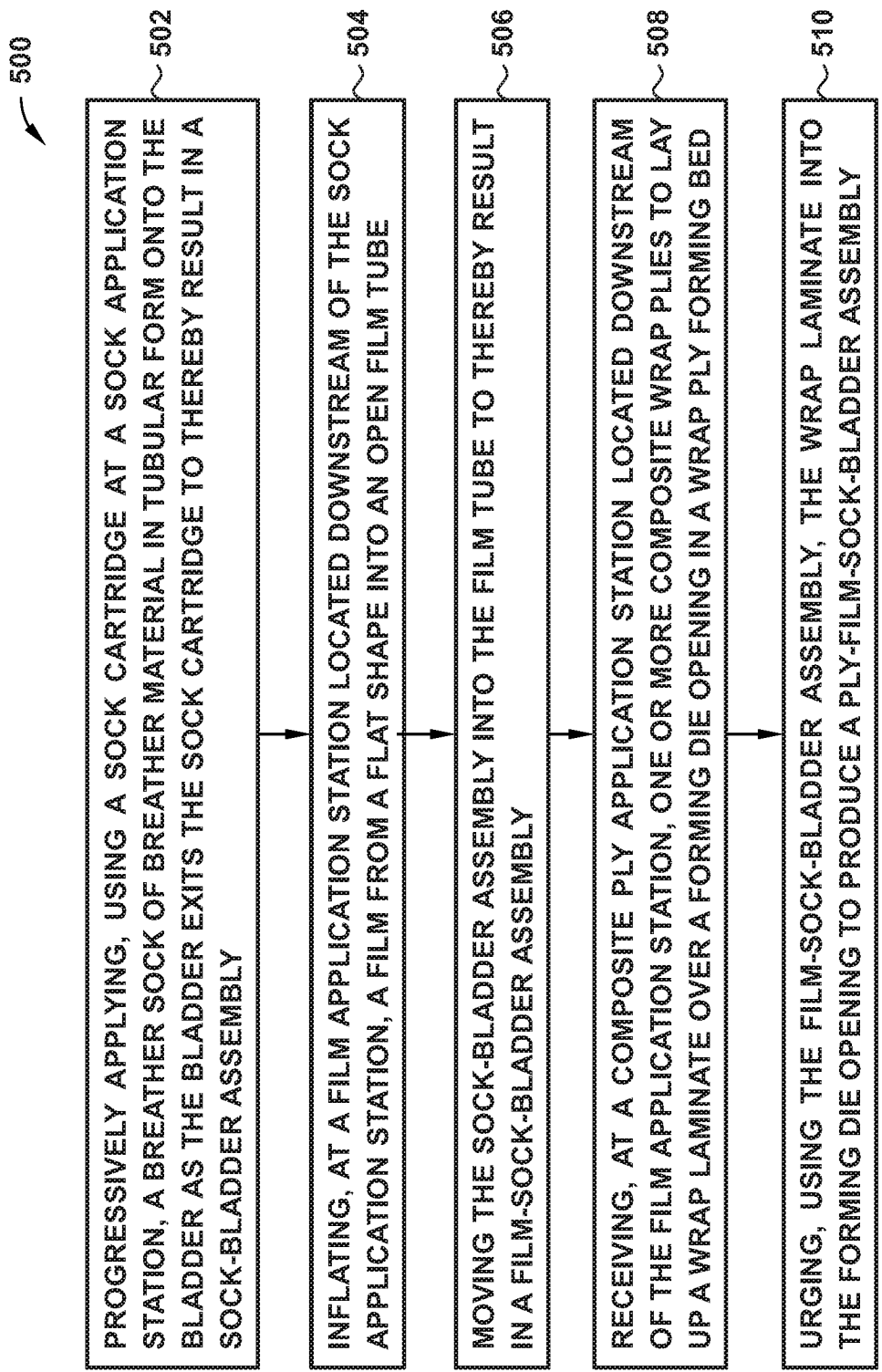

OPERATOR-ASSISTED SYSTEM AND METHOD FOR PREPARING A BLADDER FOR USE IN COMPOSITE STRINGER MANUFACTURING

FIELD

The present disclosure relates generally to composites manufacturing and, more particularly, to a system and method for preparing a bladder for use in composite stringer manufacturing.

BACKGROUND

Composite materials are used in a wide variety of applications due to their favorable properties such as high specific strength, high specific stiffness, and high corrosion resistance. The manufacturing of a composite structure typically involves the layup of multiple plies of composite laminate material to form a composite laminate. The layup material is typically a fibrous material that is pre-impregnated with resin (e.g., prepreg). For example, the layup material may be epoxy-impregnated carbon fiber prepreg.

Certain composite structures include a composite skin member and a plurality of composite stringers coupled to the skin for increasing the stiffness of the composite structure. For example, a composite wing of an aircraft may include a composite skin panel and a plurality of longitudinally extending composite stringers located on the skin inner surface. The composite stringers are typically individually laid up and formed, and then mounted on an assembly tool which is then overlaid with composite material to form a composite skin panel. The panel-stringer assembly may be co-bonded or co-cured to form a composite wing skin.

Prior to forming each composite stringer, a bladder must typically be assembled with the unformed composite stringer to maintain the shape of the composite stringer during forming. The bladder must be prepared for assembling with the composite stringer by applying a breather layer over the length of the bladder, followed by applying a release film over the breather layer. One or more composite plies may be wrapped around the film and breather covered bladder. Conventional methods for applying the breather layer, the release film, and the composite plies over a bladder are manual processes that are labor-intensive and time-consuming.

As can be seen, there exists a need in the art for a system and method for preparing bladder for use in composite stringer manufacturing and which avoids the above-noted challenges associated with conventional bladder preparation methods.

SUMMARY

The above-noted needs associated with preparing a bladder for use in composite stringer manufacturing are addressed by the below disclosure which provides a system for preparing a bladder for use in manufacturing a composite stringer. The system includes a sock application station, a film application station, and a composite ply application station. The sock application station has a sock cartridge configured to progressively apply a breather sock of breather material in tubular form onto a bladder as the bladder exits the sock cartridge to thereby result in a sock-bladder assembly. The film application station is located downstream of the sock application station and is configured to inflate a film from a flat shape into an open film tube prior to application over the sock-bladder assembly to thereby result in a film-sock-bladder assembly. The composite ply application station is located downstream of the film application station and has a wrap ply forming bed containing at least one forming bed opening and configured to receive one or more wrap plies of a wrap laminate for urging into the forming bed opening by the film-sock-bladder assembly to produce a ply-film-sock-bladder assembly.

In a further example, the system includes a sock application station, a film application station, and a composite ply application station as mentioned above. In addition, the system includes a cartridge replacement mechanism configured to remove and replace an empty sock cartridge at the sock application station with a loaded sock cartridge containing the breather sock.

Also disclosed is a method of preparing a bladder for use in manufacturing a composite stringer. The method includes progressively applying, using a sock cartridge at a sock application station, a breather sock of breather material in tubular form onto the bladder as the bladder exits the sock cartridge to thereby result in a sock-bladder assembly. In addition, the method includes. The method further includes inflating, at a film application station located downstream of the sock application station, a film from a flat shape into an open film tube. The method also includes moving the sock-bladder assembly into the film tube to thereby result in a film-sock-bladder assembly. In addition, the method includes receiving, at a composite ply application station located downstream of the film application station, one or more wrap plies to lay up a wrap laminate over a forming bed opening of a wrap ply forming bed. Furthermore, the method includes urging, using the film-sock-bladder assembly, the wrap laminate into the forming bed opening to produce a ply-film-sock-bladder assembly.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is an example of a bladder identified by reference numeral 3 of FIG. 2;

FIG. 4 is a perspective view of the bladder of FIG. 3;

FIG. 5 is a longitudinal sectional view of a portion of the bladder taken along Line 5-5 of FIG. 3 and illustrating a portion of the bladder and an air injection portion in an end fitting of the bladder;

FIG. 6 is a transverse sectional view of the bladder taken along Line 6-6 of FIG. 3;

FIG. 7 is a further example of a bladder having a smaller cross-sectional shape and size than the bladder of FIG. 6;

FIG. 8 is a still further example of a bladder having a semi-circular cross-sectional shape;

FIG. 9 is a still further example of a bladder having a trapezoidal cross-sectional shape;

FIG. 13 is a side view of a sock cutting device for cutting the breather sock after a downstream end of the sock-bladder assembly exits the sock cartridge;

FIG. 14 is an end view of an example of the sock cartridge removably mounted at the sock application station;

FIG. 15 is an end view of an example of the sock cutting device mounted at the sock application station;

FIG. 19 is a side view of the cartridge replacement mechanism taken along Line 19-19 of FIG. 18;

FIG. 20 is an end view of a loaded sock cartridge at the cartridge replacement mechanism;

FIG. 21 is a top view of a portion of the system identified by reference numeral 21 of FIG. 2 and showing a film inflation platform for installing a film tube onto a bladder pull tool to result in a tool-tube assembly;

FIG. 22 is a side view of the film inflation platform taken along Line 22-22 of FIG. 21 and showing the insertion of the bladder pull tool into the film tube while air is injected into the bladder pull tool for inflating the film to thereby allow for insertion of the bladder pull tool to result in the tool-tube assembly;

FIG. 23 is a side view of the film tube and the bladder pull tool during the injection of air into the bladder pull tool for inflating the film into a film tube;

FIG. 24 is a transverse sectional view of an example of the bladder pull tool;

FIG. 25 is a top view of a portion of the system showing an example of a film inflation platform located adjacent to a platen assembly at the film application station;

FIG. 26 is an end view of the film inflation platform and the platen assembly taken along Line 26-26 of FIG. 25 and showing a lower platen and an upper platen in an open position prior to the installation of the tool-tube assembly;

FIG. 27 shows the tool-tube assembly installed with a platen cavity defined by the lower platen and upper platen in an assembled position;

FIG. 28 is a perspective view of the lower platen and the upper platen in the open position and each including a platen surface having a plurality of apertures;

FIG. 29 is a transverse sectional view of the platen assembly identified by reference numeral 29 of FIG. 27 and showing the lower platen and the upper platen in the assembled position during the application of vacuum pressure on the apertures for vacuum coupling of the opposing sides of the film tube respectively against the lower platen and the upper platen as the sock-bladder assembly is moved into the film tube;

FIG. 30 is a side view of a portion of the system showing the tool-tube assembly installed in a platen assembly of the film application station and having one end of the tool-tube assembly removably coupled to the bladder;

FIG. 31 is a side view of an example of a bladder-tool connector mechanism for removably coupling the tool-tube assembly to a downstream end of the bladder to pull the sock-bladder assembly into an upstream end of the film tube;

FIG. 32 is a transverse sectional view of an example of the tool-tube assembly;

FIG. 33 is a side view of the bladder-tool connector mechanism coupled to the sock-bladder assembly;

FIG. 34 is an end view of an example of the bladder-tool connector mechanism coupled to the sock-bladder assembly;

FIG. 41 is a magnified view of a portion of the system identified by reference numeral 41 of FIG. 1 and illustrating a side view an example of a bladder assembly end preparation platform and a composite ply application station located downstream of the film application station;

FIG. 42 is a transverse sectional view of the bladder assembly end preparation platform taken along Line 42-42 of FIG. 41;

FIG. 43 is a side view of the bladder-tool connector mechanism coupling the bladder pull tool to the film-sock-bladder assembly;

FIG. 44 shows the bladder-tool connector mechanism detached from the film-sock-bladder assembly and also showing an end clamping element applied to an opposing end of the film-sock-bladder assembly;

FIG. 45 is a side view of the bladder assembly end preparation platform and the composite ply application station, and showing a bladder transfer mechanism for transferring the bladder pull tool to a bladder pull tool storage rack located adjacent to the composite ply application station;

FIG. 46 is a transverse sectional view of the bladder pull tool being transferred from the composite ply application station to the bladder pull tool storage rack;

FIG. 47 is a top view of the bladder pull tool being transferred from the composite ply application station to the bladder pull tool storage rack;

FIG. 48 is a side view of the bladder assembly end preparation platform and the composite ply application station, and showing a ply lamination head at the composite ply application station;

FIG. 49 is a transverse sectional view of the composite ply application station showing a wrap ply forming bed having a plurality of die cavities of different sizes and/or shapes;

FIG. 50 is a transverse sectional view of the composite ply application station showing a ply lamination head dispensing one or more composite wrap plies over one of the die cavities of the wrap ply forming bed to form a wrap laminate;

FIG. 51 is a side view of the bladder assembly end preparation platform and the composite ply application station, and showing the bladder transfer mechanism positioned over the film-sock-bladder assembly, and also showing a ply trimming device trimming the wrap laminate;

FIG. 52 is a transverse sectional view of the composite ply application station showing the ply trimming device trimming the wrap laminate;

FIG. 53 is a top view of the composite ply application station showing the ply trimming device trimming the wrap laminate on the wrap ply forming bed;

FIG. 56 is a magnified view of the portion of the composite ply application station identified by reference numeral 56 of FIG. 55, and showing the film-sock-bladder assembly urging the wrap laminate into a die cavity of the wrap ply forming bed;

FIG. 57 shows a first wrap ply folding plate folding a first protruding portion of the wrap laminate over on top of the film-sock-bladder assembly;

FIG. 58 shows a second wrap ply folding plate folding a second protruding portion of the wrap laminate over on top of the first protruding portion, and also illustrates a heating element of the second wrap ply folding plate locally heating and tacking together the first protruding portion and the second protruding portion on top of the film-sock-bladder assembly to form a wrap ply lap joint and resulting in a ply-film-sock-bladder assembly;

FIG. 59 shows the first wrap ply folding plate and the second wrap ply folding plate retracted, and also showing the bladder transfer mechanism engaging the ply-film-sock-bladder assembly;

FIG. 72 is a flow chart of operations included in a method of method of preparing a bladder for use in manufacturing a composite stringer.

DETAILED DESCRIPTION

Figure 1:
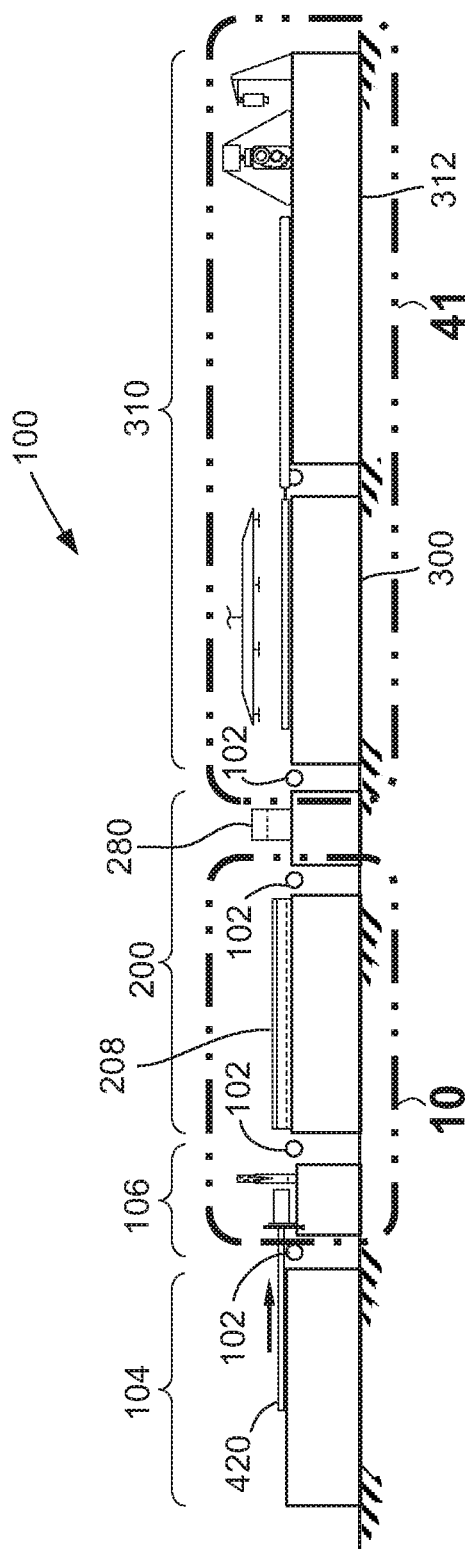
FIG. 1 is an example of a system for preparing a bladder for use in manufacturing a composite stringer, and illustrating a sock application, a film application station, and a composite ply application station.
Figure 2:
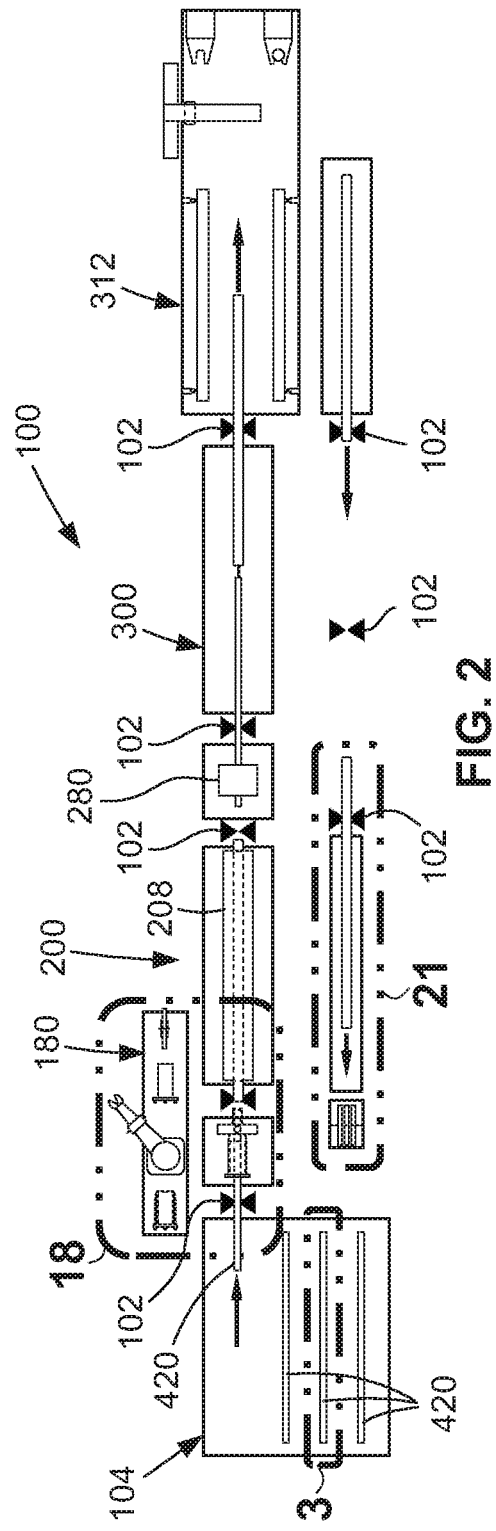
FIG. 2 is a top view of the system of FIG. 1.
Figure 70:
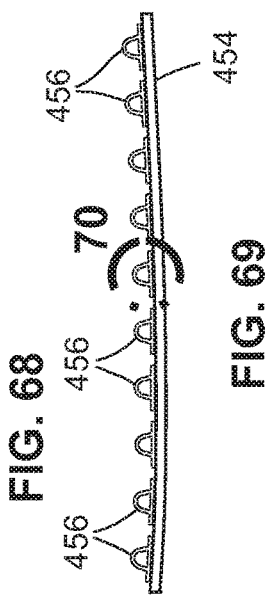
FIG. 70 is a cross-sectional view of an example of a composite stringer coupled to a composite skin panel.

Referring now to the drawings which illustrate various examples of the disclosure, shown in FIGS. 1-2 is an example of a system 100 for preparing a mandrel or bladder 420 for use in manufacturing a composite stringer 456 (FIG. 70). As described below, the composite stringer 456 may be incorporated into a composite structure such as a composite fuselage, a composite wing (FIG. 68), or any one of a variety of other composite structures. The preparation of the bladder 420 includes applying a breather sock 124 (FIG. 71) over the bladder 420, applying a film 202 (FIG. 71) over the breather sock 124, and applying a wrap laminate 364 (FIG. 71) over the film 202 prior to insertion of the film-and-sock-covered bladder 420 (FIG. 71) into a stringer cavity 458 (FIGS. 70-71) of a composite stringer 456 to facilitate consolidation and curing of the composite stringer 456.

Referring to FIGS. 1-2, the system 100 includes a sock application station 106, a film application station 200, and a composite ply application station 310. In addition, the system 100 may include a bladder staging station 104 configured to store a plurality of bladders 420. The bladder staging station 104 may comprise a surface such as a table configured support one or more bladders 420 having one or more bladder sizes and/or shapes. Although not shown, the system 100 may include a controller for controlling the operation of the system 100. For example, the controller may control the movement of the bladder 420 through the system 100, and the operation of the various components that make up the sock application station 106, the film application station 200, and the composite ply application station 310.

Referring to FIGS. 3-9, in some examples of the system 100, the bladder 420 may be an inflatable bladder having a bladder body 422. The bladder body 422 may be comprised of rubber, silicone, or other flexible or elastomeric material.

The bladder body 422 may have a hollow bladder interior. The bladder 420 may include an end fitting 426 affixed to each of opposing ends of the bladder body 422 as shown in FIGS. 3-4. Each end fitting 426 may be formed of a rigid material such as a metallic material (e.g., aluminum). As shown in FIG. 5, at least one of the end fittings 426 may have a pressure port 428 for injecting a gas (e.g., air, nitrogen) into the bladder interior during consolidation and/or curing of the composite stringer 456 (FIG. 70). The injection of gas into the bladder 420 may facilitate the compaction of the composite material 360 (FIG. 71) of the composite stringer 456 while maintaining the cross-sectional shape of the composite stringer 456 during consolidation and/or curing.

In the presently-disclosed examples, the system 100 is configured for preparing bladders 420 of different cross-sectional shapes and/or different cross-sectional sizes, as shown in FIGS. 6-9. For example, FIGS. 6-7 show two (2) bladders 420 having different cross-sectional sizes but having the same tapered cross-sectional shape with a rounded cap. FIG. 8 shows a bladder 420 having a semi-circular cross-sectional shape. FIG. 9 shows a bladder 420 having a trapezoidal cross-sectional shape. In some examples, the bladder 420 may have a relatively long length. For example the bladder 420 of a composite stringer 456 for a composite wing (FIG. 67) may have a length up to 80 feet or more. Although the sock application station 106 is described in the context of applying a breather sock 124 (FIG. 71) over a bladder 420, the sock application station 106 may be implemented for applying breather sock 124 over a mandrel (not shown), or applying any other type of elastomeric material over any type of elongate member (not shown).

Referring briefly back to FIGS. 1-2, the sock application station 106 is located downstream of the bladder staging station 104 (FIGS. 1-3) and may sequentially receive bladders 420 from the bladder staging station 104. The system 100 may include a plurality of drive rollers 102 mounted at spaced locations along a lengthwise direction of the system 100. The drive rollers 102 may be configured to provide pulsing movement of the bladder 420 from station to station. The drive rollers 102 may be rotatably driven by one or more motors (e.g., electric motors—not shown). Rotation of the drive rollers 102 causes the bladder 420 and a bladder pull tool 240 (FIGS. 21-24 and 30-34) to be moved from station to station. In the example of FIGS. 1-2, the system 100 may include a drive roller 102 between the bladder staging station 104 and the sock application station 106 for moving the bladder 420 from the bladder staging station 104 to the sock application station 106. The system 100 may also include a drive roller 102 between the sock application station 106 and the film application station 200, a drive roller 102 between the film application station 200 and a heat shrink device 280, a drive roller 102 between the heat shrink device 280 and a bladder assembly end preparation platform 300, and a drive roller 102 between the bladder assembly end preparation platform 300 and the wrap ply forming bed 312 of the composite ply application station 310. The system 100 may additionally include one or more drive rollers 102 for transferring each bladder pull tool 240 from the composite ply application station 310 back to the film application station 200 for reuse, as described below.

Referring to FIGS. 10-14, the sock application station 106 has a sock cartridge 110 configured to receive the bladder 420 from the bladder staging station 104. The sock cartridge 110 is configured to progressively apply a breather sock 124 of breather material in tubular form onto the bladder 420 as the bladder 420 exits the sock cartridge 110 to thereby result in a sock-bladder assembly 140. During the manufacturing of a composite stringer 456 (FIGS. 70-71), the breather sock 124 (i.e., a breather layer) may facilitate airflow along the length of the bladder 420 for evacuation of moisture, gas, and volatiles that may be released from the bladder 420 during curing of the composite stringer 456. In addition, the film 202 FIG. 71 may isolate the breather sock 124 FIG. 71) from the composite wrap plies 362 (FIG. 71) surrounding the bladder 420 to thereby prevent resin in the composite wrap plies 362 from adhering or bonding to the breather sock 124 during curing of the composite stringer 456. In addition, the film 202 may be non-binding to the composite wrap plies 362 surrounding the bladder 420, and may thereby facilitate the removal of the bladder 420 from the stringer cavity 458 (FIG. 71) after curing is complete.

Referring still to FIGS. 10-14, the sock cartridge 110 may be a generally hollow member. For example, the sock cartridge 110 may be a cylindrically shaped tubular element having a cartridge body outer surface 114 and a hollow cartridge interior 112 open on both ends. The sock cartridge 110 may include a sock backstop 116 located on an upstream end of the sock cartridge 110. The sock backstop 116 may be an annular flange protruding radially outwardly from the cartridge body outer surface 114 and against which an upstream end of the breather sock 124 may be butted when the breather sock 124 is loaded onto the cartridge body outer surface 114.

The sock application station 106 may include a cartridge support stand 108 configured to support the sock cartridge 110. In the example shown, the sock cartridge 110 may include a pair of lower posts 120 protruding downwardly from the sock backstop 116. The cartridge support stand 108 may include at least one pair of sockets 122 configured to receive the lower posts 120 for supporting the sock cartridge 110 on the cartridge support stand 108. However, the sock cartridge 110 may be supported on the cartridge support stand 108 by any one of a variety of arrangements, and is not limited to the above-described post-socket arrangement shown. The sock cartridge 110 may also include an upper post 118 protruding upwardly from the sock backstop 116 to provide a mechanism by which the sock cartridge 110 (e.g., when empty) may be transferred from the sock application station 106 to a cartridge reloading stand 180 (FIGS. 2 and 18-20) as described in greater detail below.

Figure 10:
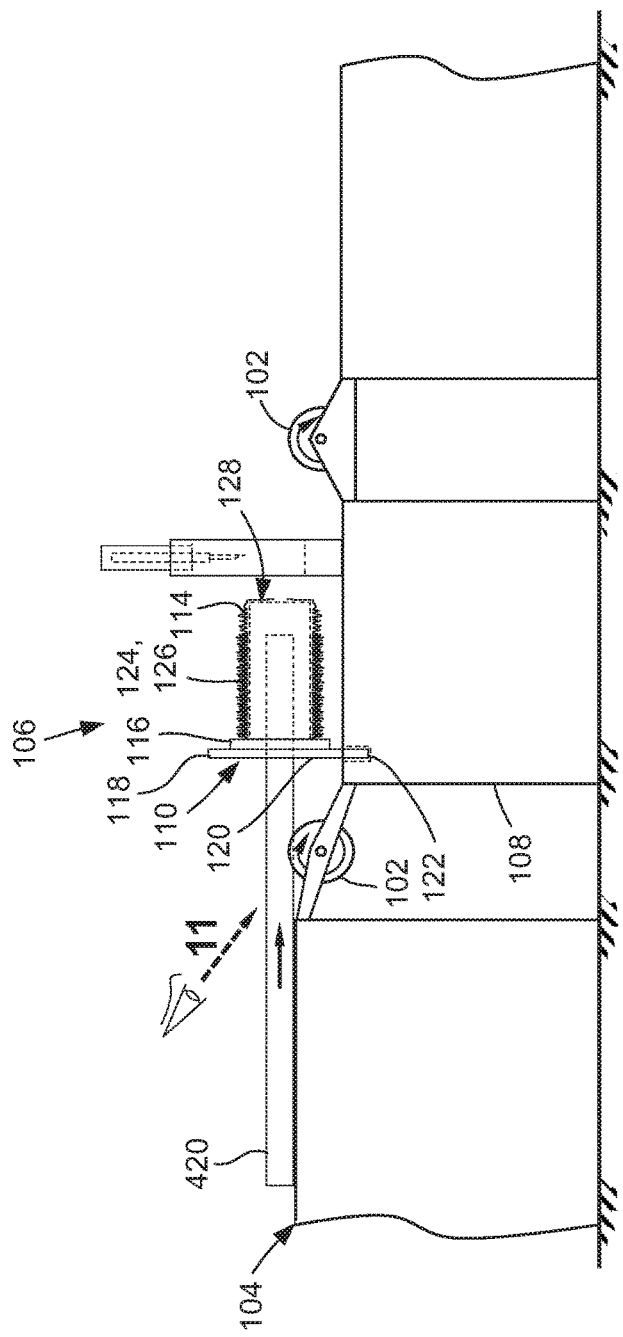
FIG. 10 is a magnified view of a portion of the system identified by reference numeral 10 of FIG. 1 and illustrating a bladder moving into a sock cartridge of the sock application station.
Figure 12:
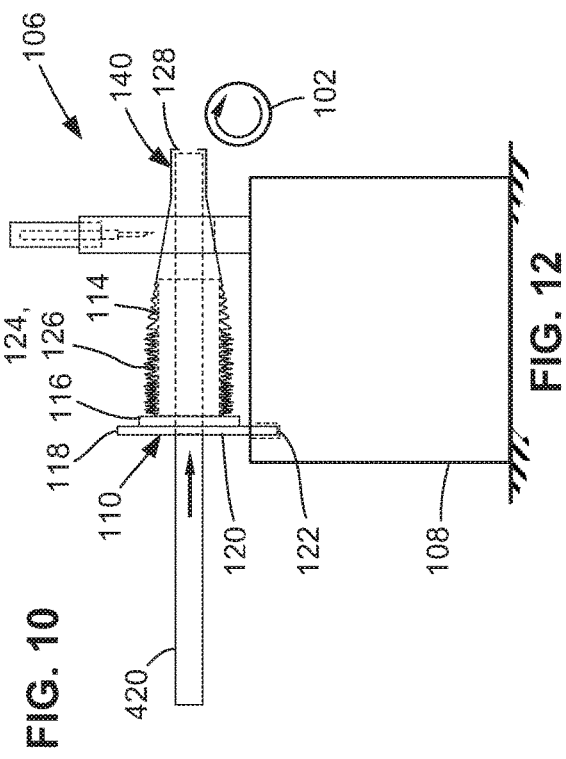
FIG. 12 is a side view of a breather sock on a sock cartridge and illustrating the progressive application of the breather sock onto the bladder as the bladder exits the sock cartridge to thereby result in a sock-bladder assembly.
Figure 11:
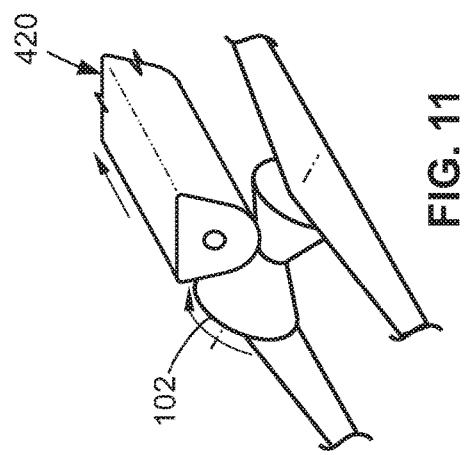
FIG. 11 is a perspective view of an example of one of a plurality of drive rollers for moving the bladder through the system.

Referring still to FIGS. 10-14, the cartridge body outer surface 114 is configured to support the breather sock 124 in a gathered arrangement 126 (FIGS. 10, 12, 13). The gathered arrangement 126 of the breather sock 124 may be extended to a sock length that is at least as long as the bladder 420 to ensure that the entire length of the bladder 420 is covered by the breather sock 124 after the upstream end of the bladder 420 exits the sock cartridge 110. The breather sock 124 may be mounted on the cartridge body outer surface 114 such that a sock overhang 128 extends over a downstream end of the sock cartridge 110. The sock overhang 128 may described as a relatively short length of breather material that is shorter than the width of the bladder 420. The breather sock 124 has a smaller diameter than the bladder 420 when the breather sock 124 is in a non-radially-expanded state, such as prior to being loaded onto the cartridge body outer surface 114. The breather sock 124 is capable of resiliently radially expanding or stretching for loading onto the cartridge body outer surface 114.

The relatively small diameter of the breather sock 124 in its natural, unexpanded state results in the sock overhang 128 being stretched across the opening of the downstream end of the sock cartridge 110 (FIGS. 10, 12). The downstream end of the bladder 420 engages the sock overhang 128 as the downstream end of the bladder 420 exits the cartridge interior 112, and causes the breather sock 124 to be progressively pulled off of the cartridge body outer surface 114 and onto the bladder 420. The breather material of the breather sock 124 may be relatively thin (e.g., less than 0.100 inch thick) and may be comprised of natural (e.g., cotton, wool, linen, etc.) or synthetic fibers (e.g., polyester, Nylon™, Rayon™, etc.) that may be woven or non-woven, knitted, or otherwise intertwined (e.g., felt) or interconnected in a manner allowing the breather sock 124 to expand for loading onto the cartridge body outer surface 114, and contract against the bladder side surfaces 424 when progressively pulled off of the sock cartridge 110 and onto the bladder 420.

Referring to FIGS. 13-17, the system 100 may optionally include a sock cutting device 150 located downstream of the sock cartridge 110. In the example shown, the sock cutting device 150 is mounted on the cartridge support stand 108 and is located between the sock cartridge 110 and the film application station 200 (FIGS. 1-2). The sock cutting device 150 may be controlled by the controller (not shown) to cut the breather sock 124 after a sensor (not shown) senses that the downstream end of the sock-bladder assembly 140 has exited the sock cartridge 110. The controller may temporarily halt the rotation of the drive rollers 102 as a means to temporarily stop the movement of the bladder 420 to allow the sock cutting device 150 to cut the breather sock 124 to separate the breather sock 124 from any breather sock material remaining on the cartridge body outer surface 114.

Figure 16:
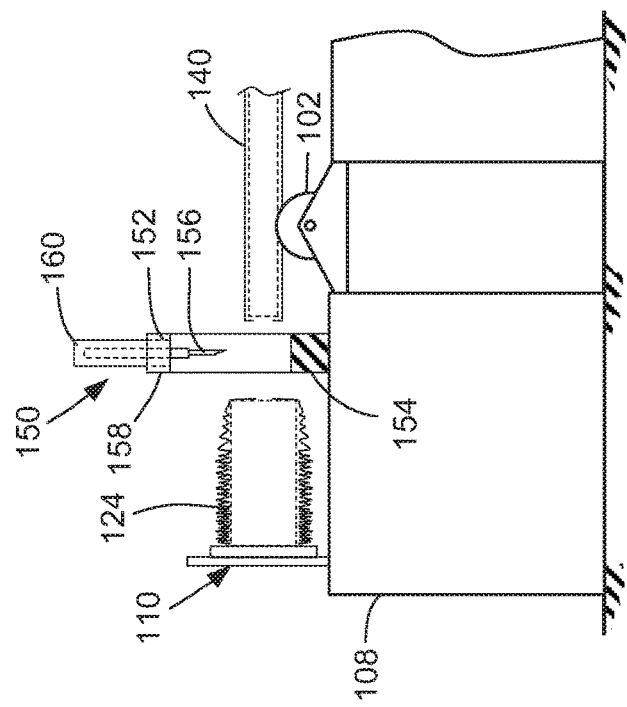
FIG. 16 is a side view of the sock application station showing the breather sock being cut by the sock cutting device.
Figure 17:
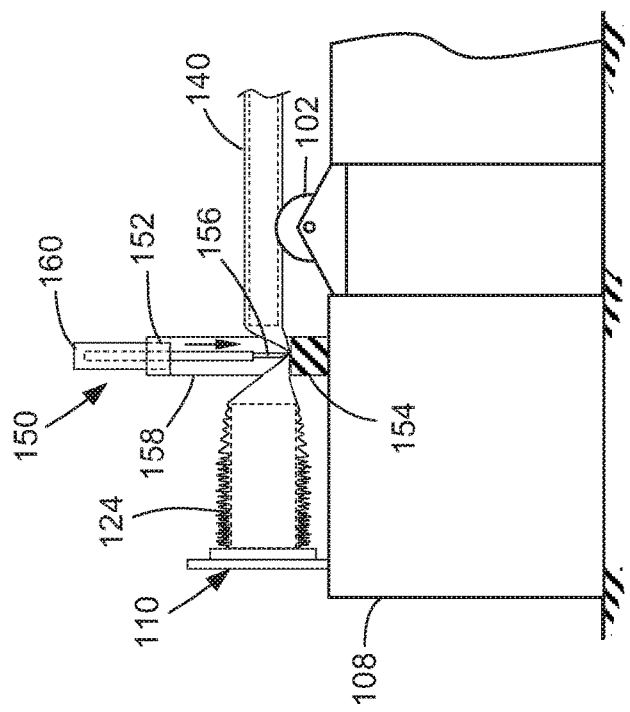
FIG. 17 is a side view of the sock application station showing the sock-bladder assembly after the breather sock is cut by the sock cutting device.

Referring to FIGS. 15-17, in one example, the sock cutting device 150 may be configured as a guillotine cutter 152 having a sock cutting block 154 and a sock cutting blade 156 supported on opposite sides by a blade guide 158. The sock cutting device 150 may be actuated by a blade actuator 160. The blade actuator 160 may be controlled by the controller for moving the sock cutting blade 156 downwardly to cut the breather sock 124 against the sock cutting block 154. The breather sock 124 may be cut to a sock length that results in the breather sock 124 extending slightly (e.g., no more than 6 inches) past the upstream end of the bladder 420 after the upstream end exits the sock cartridge 110 and prior to the upstream end of the bladder 420 entering the below-described platen assembly 208 (FIGS. 1-2) of the film application station 200.

In some examples of the system 100, the breather sock 124 may be pre-cut and loaded onto the sock cartridge 110 in a sock length that is slightly longer than the bladder length, thereby avoiding the need for cutting the breather sock 124. However, in other examples, the breather sock 124 may be loaded onto the sock cartridge 110 in a length that is longer than what is required for covering a single bladder 420. For example, the length of breather sock 124 loaded onto the sock cartridge 110 may be sufficient for covering two (2) or more bladders 420, and which may necessitate a sock cutting device 150 for cutting the breather sock 124 at the upstream end of at least the first bladder 420. Although shown as the above-described guillotine cutter 152, the sock cutting device 150 may be provided in any one of a variety of configurations capable of cutting the breather sock 124. In still other examples, the sock cutting device 150 may be omitted from the system 100, and the breather sock 124 may be manually cut by an operator or technician after the upstream end of the bladder 420 exits the downstream end of the sock cartridge 110.

Figure 18:
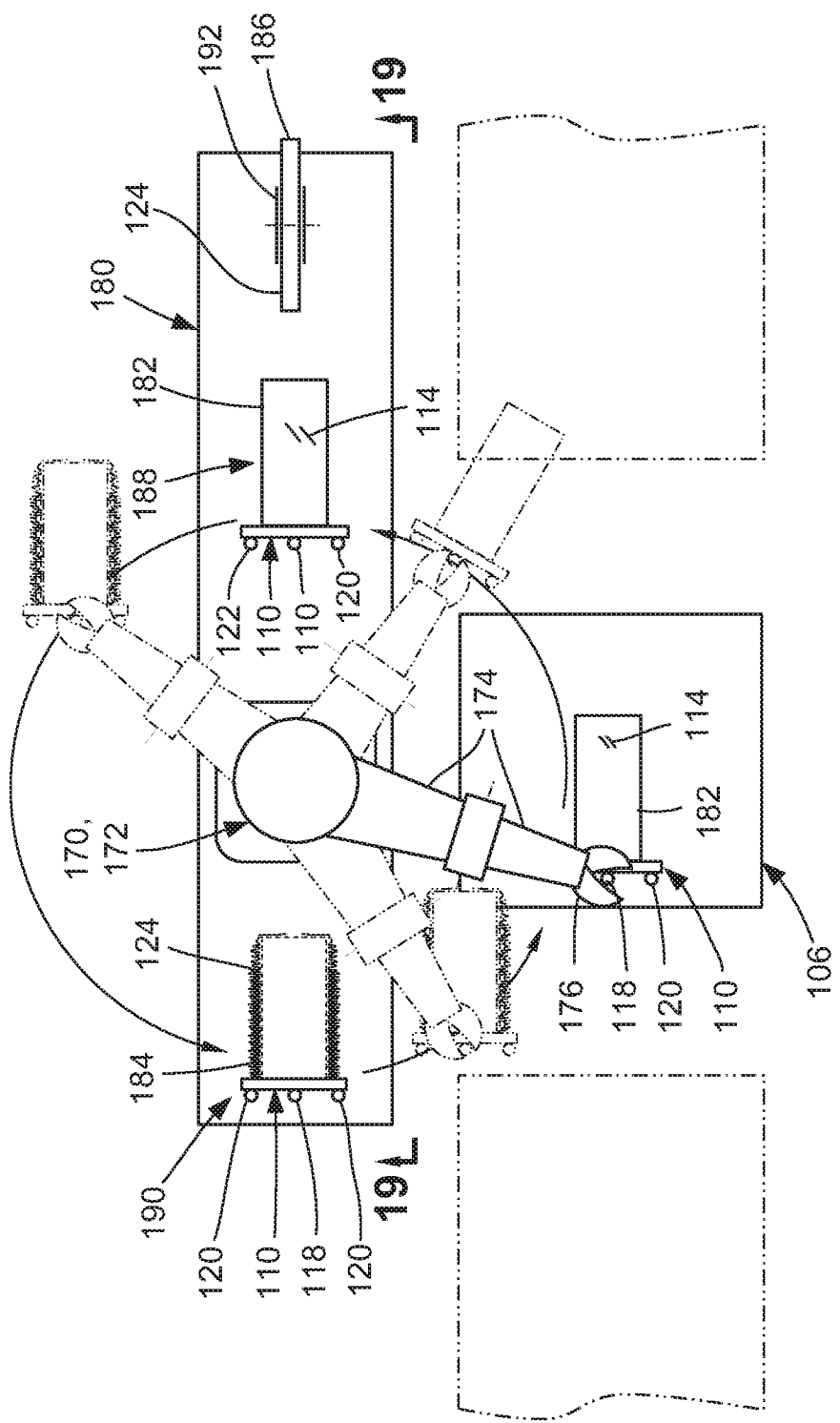
FIG. 18 is a top view of a portion of the system identified by reference numeral 18 of FIG. 2 and showing a cartridge replacement mechanism configured to remove and replace an empty sock cartridge at the sock application station with a loaded sock cartridge containing the breather sock.

Referring to FIGS. 18-20, the system 100 may optionally include a cartridge replacement mechanism 170 configured to autonomously (i.e., without human intervention) replace an empty sock cartridge 182 at the sock application station 106, with a loaded sock cartridge 184 in preparation for a next bladder 420 to be passed through the sock application station 106. In the example shown, the cartridge replacement mechanism 170 may be configured as a robotic device 172 having one or more robotic arms 174 and an end effector 176 configured to grasp the upper post 118 protruding upwardly from the sock cartridge 110. The cartridge replacement mechanism 170 may include at least one sensor (not shown) configured to sense that a bladder 420 has passed through the sock cartridge 110 and/or that the sock cartridge 110 is an empty sock cartridge 182 devoid of breather material on the cartridge body outer surface 114. As shown in the example of FIGS. 18-19, the end effector 176 of the robotic device 172 may engage or grasp the upper post 118 of the empty sock cartridge 182, and vertically lift the empty sock cartridge 182 to lift the pair of lower posts 120 out of the pair of sockets 122 in the cartridge support stand 108, allow the robotic device 172 to move the empty sock cartridge 182 to an empty cartridge position 188 on the cartridge reloading stand 180. The cartridge reloading stand 180 may include a pair of sockets 122 (FIG. 20) at the empty cartridge position 188 for receiving the lower posts 120 (FIG. 20) of the empty sock cartridge 182. In addition, the cartridge reloading stand 180 may include a pair of sockets 122 at a loaded cartridge position 190 for receiving the lower posts 120 of a loaded sock cartridge 184.

As shown in FIGS. 18-20, the cartridge reloading stand 180 may be located adjacent to the cartridge support stand 108 and is configured to receive the empty sock cartridge 182 at the empty cartridge position 188 via the cartridge replacement mechanism 170. Although shown as a robotic device 172, the cartridge replacement mechanism 170 may be provided in any one of a variety of configurations. For example, the cartridge replacement mechanism 170 may be configured as a pick-and-place machine (not shown), as an overhead gantry or crane (not shown), or in another configuration for moving sock cartridges 110 between the cartridge support stand 108 and the cartridge reloading stand 180. The cartridge reloading stand 180 may include a breather material storage rack 192 containing one or more breather material spools 186. Each breather material spools 186 may contain a continuous length of breather sock 124 wound onto the breather material spool 186. In some examples, a breather material storage rack 192 may contain a plurality of breather material spools 186 containing breather material in different sizes (e.g., widths or diameters) complementary to different cross-sectional sizes and/or different cross-sectional shapes of the bladder 420.

Referring to FIGS. 18-19, once an empty sock cartridge 182 is installed (e.g., via the cartridge replacement mechanism 170) at the empty cartridge position 188 of the cartridge reloading stand 180, breather material may be manually loaded by an operator or technician onto the cartridge body outer surface 114 of the empty sock cartridge 182 from the breather material spool 186, and thereby resulting in a loaded sock cartridge 184. The loaded sock cartridge 184 may be transferred by the cartridge replacement mechanism 170 (e.g., robotic device 172) from the empty cartridge position 188 to the loaded cartridge position 190. The cartridge replacement mechanism 170 may also move the loaded sock cartridge 184 from the loaded cartridge position 190 at the cartridge reloading stand 180, to the cartridge support stand 108 at the sock application station 106. Advantageously, the cartridge replacement mechanism 170 provides a means for automated replacement of sock cartridges 110 without impacting production flow.

Referring now to FIGS. 21-34, shown in FIGS. 25-29 is an example of the film application station 200 having a film tube support stand 206. The film application station 200 is located downstream of the sock application station 106 and is configured to at least partially inflate a film 202 (FIGS. 21-23, 25) from a flat shape into an open film tube 204 (FIGS. 23, 25) that is open at both ends. The open film tube 204 may be supported on the film tube support stand 206. The film application station 200 may additionally include a film inflation platform 270 as also shown in FIGS. 21-24, and described below.

In the example of FIGS. 25-29, the film application station 200 may include a platen assembly 208 mounted on the film tube support stand 206. The platen assembly 208 may include a lower platen 210 and an upper platen 212. In the example shown, the lower platen 210 is stationary, and the upper platen 212 may include one or more platen actuators 218 to facilitate vertical movement of the upper platen 212 for moving the upper platen 212 and lower platen 210 between an open position 214 (FIGS. 26 and 28) and an assembled position 216 (FIGS. 27 and 29). The lower platen 210 and the upper platen 212 each include a platen surface 220 having a plurality of apertures 222 (FIG. 28).

As shown in FIGS. 27 and 29, the lower platen 210 and the upper platen 212 in the assembled position 216 define a platen cavity 226 (FIG. 29) that is open on opposite ends. The platen cavity 226 is configured to receive the film tube 204 (FIG. 25) which may be supported on the bladder pull tool 240 (FIG. 25). The platen cavity 226 may have a cross-sectional shape and size that is complementary to or slightly larger than the cross-sectional shape and size of the bladder 420. However, in order to accommodate bladders 420 of different cross-sectional shapes and sizes, the platen cavity 226 may have a cross-sectional shape that is slightly larger than the largest cross-sectional size of bladders 420 to be processed by the system 100.

Figure 36:
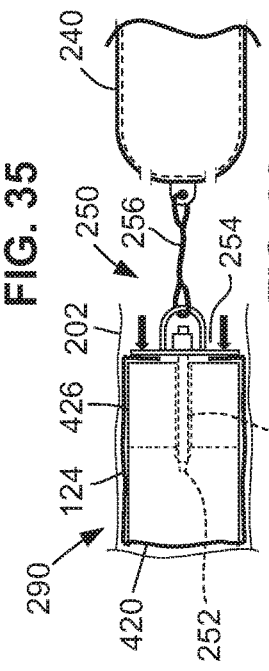
FIG. 36 is a side view of the bladder-tool connector mechanism coupling the tool-tube assembly to the film-sock-bladder assembly.
Figure 37:
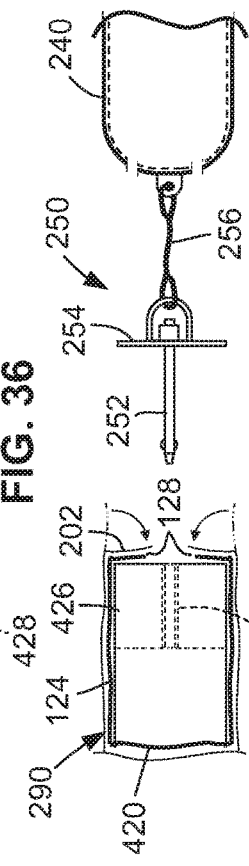
FIG. 37 shows the bladder-tool connector mechanism temporarily detached from the end of the bladder, and showing the end of the film tube being folded over against the end of the bladder.
Figure 38:
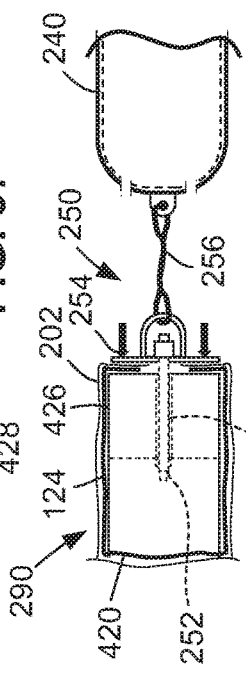
FIG. 38 shows the bladder-tool connector mechanism re-attached to the end of the bladder.

The apertures 222 (FIG. 28) in the platen surface 220 of the lower platen 210 and the upper platen 212 may be fluidly coupled to a vacuum pressure source 228 (FIG. 22; e.g., a vacuum pump). The vacuum pressure source 228 is activatable (e.g., by a controller) for generating a suction force 224 (FIG. 29) at the apertures 222 for vacuum coupling of the opposing sides of the film tube 204 respectively against the lower platen 210 and the upper platen 212 as the sock-bladder assembly 140 (FIG. 25) is moved into the film tube 204 which is contained within the platen cavity 226. In this regard, vacuum coupling holds the film tube 204 statically in position within the platen cavity 226 while the sock-bladder assembly 140 is pulled into the film tube 204, after which the vacuum pressure source 228 is deactivated to allow the film tube 204 to release from the lower platen 210 and upper platen 212. The release of the film tube 204 onto the sock-bladder assembly 140 results in a film-sock-bladder assembly 290 (FIGS. 36-38).

Referring to FIGS. 21-25, shown is an example of a bladder pull tool 240 which may be included with the system 100 for moving the film tube 204 in between the upper platen 212 and lower platen 210 (FIGS. 28-29) in the open position 214 (FIGS. 28-29), and to facilitate vacuum coupling of the film tube 204 to the platen surfaces 220 of the upper platen 212 and lower platen 210 (FIG. 29). As shown in FIGS. 21-23 and described below, the film tube 204 may be pre-installed over the bladder pull tool 240 at the film inflation platform 270 which may be located adjacent to the platen assembly 208, as shown in FIG. 25. In addition to facilitating vacuum coupling of the film tube 204 to the upper platen 212 and lower platen 210 of the platen assembly 208, the bladder pull tool 240 may also assist in moving the bladder 420 from station to station through the system 100 in a manner described below.

The bladder pull tool 240 may be a lightweight, generally hollow member, and may be formed of metallic material, plastic material, or other preferably lightweight material. The bladder pull tool 240 may have a cross-sectional shape (FIG. 24) and size that is complementary to the cross-sectional shape and size of the platen assembly 208 in the assembled position 216 (FIG. 29) to facilitate vacuum engagement of the upper and lower platen 210 to the film tube 204. In addition, the bladder pull tool 240 may be at least as long as the film tube 204, and may be longer than the platen assembly 208 such that the opposing ends of the bladder pull tool 240 extend beyond the ends of the platen cavity 226 as shown in FIG. 25.

Referring to FIGS. 21-25, shown is an example of the film inflation platform 270. The film inflation platform 270 may include a lengthwise notch 308 (FIGS. 26-27) or other geometric shape having a cross-section that is sized to stably support a range of cross-sectional shapes of the bladder 420. The film inflation platform 270 may support the bladder pull tool 240 during installation of the film tube 204 over the bladder pull tool 240 to result in a tool-tube assembly 260 (FIG. 25). As shown in FIGS. 21-22, the film inflation platform 270 may include a film storage rack 272 supporting one or more film material spools 274. Each film material spool 274 may contain a continuous length of film 202 in a flat shape and wound on the film material spool 274.

Figure 62:
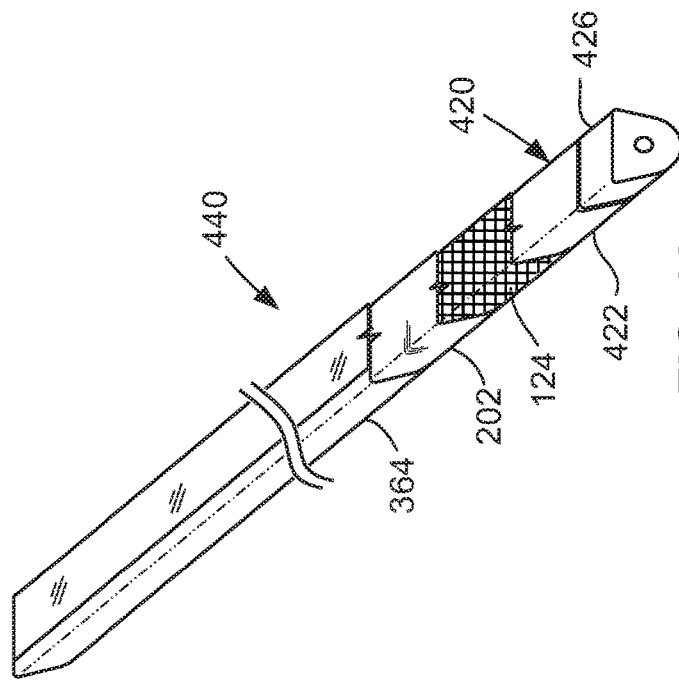
FIG. 62 is a perspective view of the ply-film-sock-bladder assembly.
Figure 71:
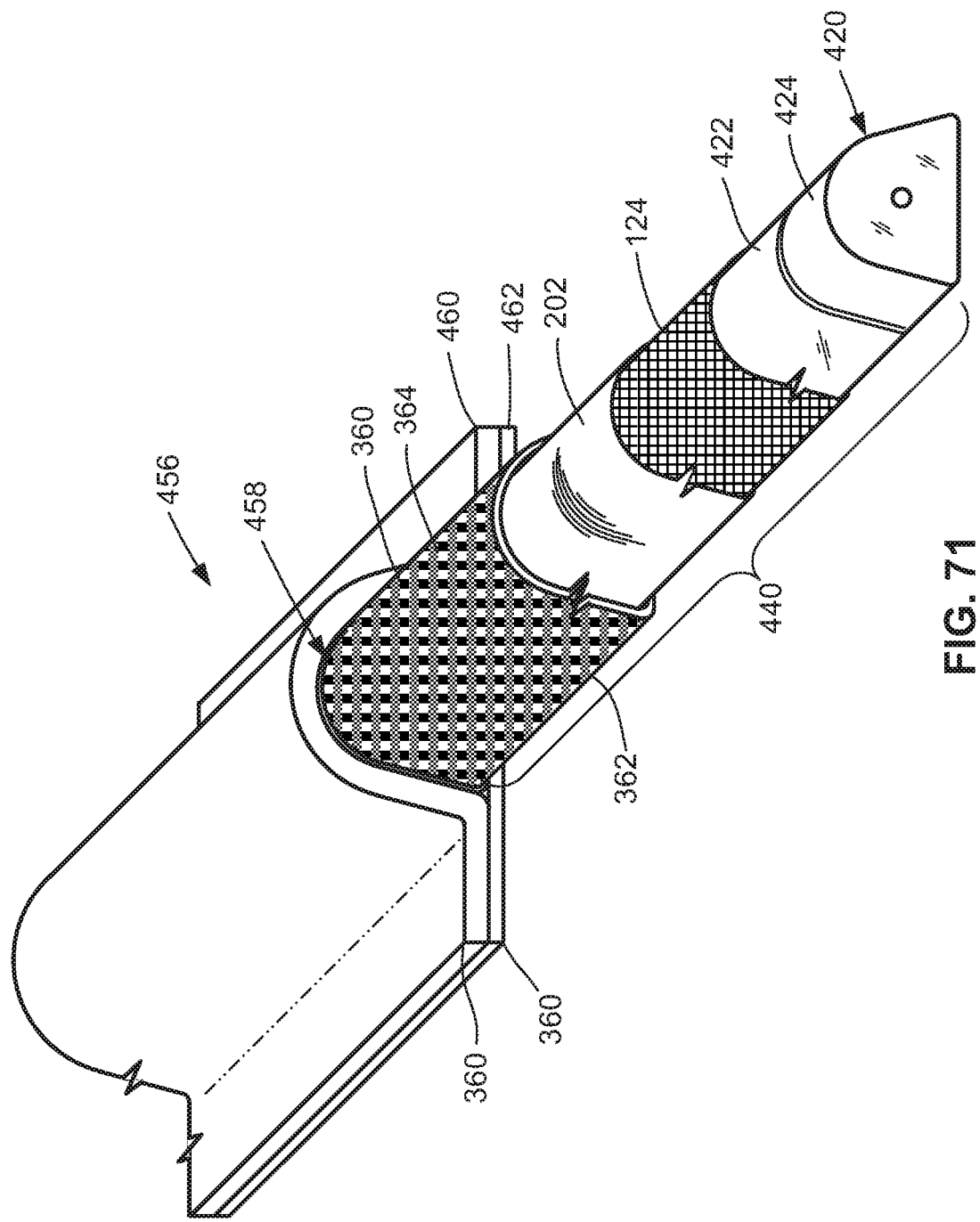
FIG. 71 is a perspective view of a portion of a composite stringer showing a film-sock-bladder assembly protruding from a stringer cavity of the composite stringer.

The film 202 may be a relatively thin material having a composition that is chemically non-reactive with the composite material 360 of the composite stringer 456 (FIGS. 70-71). For example, the film 202 material may be polyolefin, polyvinylchloride, polyethylene (e.g., low density polyethylene), polypropylene or any other type of other type of film 202 that is chemically non-reactive with the resin in the composite material 360. As mentioned above, the film 202 may isolate the breather sock 124 (FIG. 71) from the composite wrap plies 362 (FIG. 71) surrounding the film-sock-bladder assembly 290, and may thereby prevent the resin of the composite wrap plies 362 from adhering to the breather sock 124 during curing of the composite stringer 456. In addition, the film 202 may facilitate the removal of the bladder 420 from the stringer cavity 458 of the composite stringer 456 after curing. In the open tubular shape, the film 202 may have a diameter that preferably closely encircles the cross-sectional shape of the sock-covered bladder 420 (i.e., the sock-bladder assembly 140—FIG. 17). As mentioned below, the film 202 may be a shrink wrap film configured to permanently shrink when heated, causing the shrink wrap film to compress against the outer surfaces of the sock-bladder assembly 140 as shown in FIG. 62.

Referring to FIGS. 21-22, the film 202 may be drawn from a film material spool 274 and installed over the bladder pull tool 240. As mentioned above, the film storage rack 272 may have a plurality of film material spools 274 each containing a film 202 having a cross-sectional size (e.g., in the open tube shape) that is complementary to one of a variety of different cross-sectional sizes of the bladder 420. The film tube 204 in the open shape may have a width or diameter that closely encircles the cross-sectional shape of the sock-bladder assembly 140 such that when heated, the film tube 204 may shrink tightly around the sock-bladder assembly 140 with minimal gaps between the heat shrink film 202 and the outer surfaces of the sock-bladder assembly 140. In the example of FIG. 21, the film storage rack 272 includes three (3) film material spools 274 each containing film 202 having a cross-sectional size (e.g., in the open tube shape) that is complementary to one of three (3) different cross-sectional shapes (e.g., FIGS. 6-8) and/or sizes of the bladder 420 that the disclosed example of the composite ply application station 310 is configured to receive (e.g., FIGS. 49-50). However, as indicated above, the system 100 may be configured to process any one or more cross-sectional shapes of the bladder 420, and is not limited to processing three (3) different cross-sectional shapes of the bladder 420.

Referring still to FIGS. 21-24, the film storage rack 272 may allow for the lateral positioning of a selected one of the film material spools 274 into alignment with the bladder pull tool 240. For example, the film material spools 274 may be horizontally slidable along the film storage rack 272. The bladder pull tool 240 may be at least partially supported on the film inflation platform 270 as shown in FIGS. 21-22. As described below and shown in FIG. 2, the film inflation platform 270 is configured to receive the bladder pull tool 240 from the pull tool storage rack 304 which may be located at a downstream end of the system 100. As the bladder pull tool 240 is moved onto the film inflation platform 270 with the assistance of one or more drive rollers 102 optionally located between the film inflation platform 270 and the pull tool storage rack 304, the film 202 may be manually drawn (e.g., via an operator or technician) from the film material spool 274 and pulled onto the bladder pull tool 240. The bladder pull tool 240 may include an air injection port 242 (FIG. 23) on the downstream end of the bladder pull tool 240. The air injection port 242 may be fluidly coupled to a pressurized air source 244 (FIG. 22) for injecting pressurized air into the bladder pull tool 240. In addition, the bladder pull tool 240 may include one or more air holes 246. For example, FIG. 23 shows air holes 246 formed on the end of the bladder pull tool 240 opposite the air injection port 242.

The injection of pressurized air into the air injection port 242 (FIG. 23) may result in the discharge of the air from the one or more air holes 246 (FIG. 23), causing the air to flow into the film 202 which may be partially installed over the upstream end of the bladder pull tool 240 as shown in FIG. 21-23. As mentioned above, the film 202 may initially be in a flat cross-sectional shape as the film 202 is drawn off the film material spool 274. The discharge of air from the air holes 246 on the end of the bladder pull tool 240 may cause the film 202 to radially expand and/or partially inflate to form a film tube 204. The radial expansion and/or partial inflation of the film tube 204 may facilitate insertion of the full length of the bladder pull tool 240 into the film tube 204 to result in the tool-tube assembly 260 (FIG. 25).

Referring again to FIGS. 25-29, with the film tube 204 applied over the length of the bladder pull tool 240, the tool-tube assembly 260 may be laterally translated from the film inflation platform 270 to the platen assembly 208 in the open position 214 as shown in FIGS. 25-26. Transferring of the tool-tube assembly 260 may be performed by one or more operators or technicians manually lifting the tool-tube assembly 260 from the film inflation platform 270 and placing the tool-tube assembly 260 onto the lower platen 210 as shown in FIG. 26. Alternatively and/or additionally, an overhead lifting device (not shown) may be implemented for transferring the tool-tube assembly 260 onto the lower platen 210. As mentioned above, the bladder pull tool 240 is configured to maintain the film tube 204 in an open cross-sectional shape within the platen cavity 226 (FIG. 29) to facilitate vacuum engagement (FIG. 29) of the film tube 204 to the lower platen 210 and upper platen 212. In this regard, the bladder pull tool 240 may have a cross-sectional shape (FIG. 24) and size that is complementary to the cross-sectional shape and size of the platen cavity 226 (FIG. 32). For example, the bladder pull tool 240 may have a cross-sectional shape that places the opposing sides of the film tube 204 in close proximity to the platen surfaces 220 to enable vacuum engagement of the upper platen 212 and lower platen 210 respectively to opposite sides of the film tube 204.

Referring to FIGS. 30-34, shown in FIG. 30 is the tool-tube assembly 260 positioned within the platen cavity 226 of the platen assembly 208. FIG. 32 is a cross-sectional view of the tool-tube assembly 260 showing the film tube 204 surrounding the bladder pull tool 240. As shown in FIGS. 30, 31 and 33, the upstream end of the bladder pull tool 240 of the tool-tube assembly 260 may be removably coupled to a downstream end of the sock-bladder assembly 140 to assist in pulling the sock-bladder assembly 140 from the sock application station 106 into the film tube 204 as the bladder pull tool 240 is pulled (e.g., by the drive rollers 102) out of the film tube 204. As mentioned above, the film tube 204 remains vacuum-coupled to the platen surfaces 220 of the upper platen 212 and lower platen 210 while the bladder pull tool 240 moves out of the film tube 204 and the sock-bladder assembly 140 moves into the film tube 204.

Referring to FIGS. 31, 33 and 34, shown is an example of a bladder-tool connector mechanism 250 for releasably coupling the bladder pull tool 240 to the sock-bladder assembly 140. Although the bladder-tool connector mechanism 250 may be provided in any one of a variety of different configurations, in the example shown, the bladder-tool connector mechanism 250 comprises a cable extending from the bladder pull tool to a pin which engageable to the end fitting 426 of the bladder 420. The pin may be a ball lock pin 252 having radially movable ball bearings (not shown) at the terminal end of the ball lock pin 252. The ball lock pin 252 may be sized and configured to be insertable into the pressure port 428 in the end fitting 426 of the bladder 420. The ball bearings may be biased radially outwardly for retaining the ball lock pin 252 with the end fitting 426 of the bladder 420. The ball lock pin 252 of the bladder-tool connector mechanism 250 may include an end clamping plate 254 as shown in FIGS. 33-34 for clamping the breather sock 124 against the exterior end face of the end fitting 426 of the bladder 420. The end clamping plate 254 may prevent the breather sock 124 from slipping off of the bladder 420 as the bladder pull tool 240 pulls the sock-bladder assembly 140 into the film tube 204, which is secured via suction force 224 (FIG. 29) within the platen cavity 226. Once the sock-bladder assembly 140 is fully within the film tube 204, the vacuum pressure source 228 (FIG. 30) may be deactivated to stop the application of suction force 224 (FIG. 29) otherwise coupling the film tube 204 to the platen surfaces 220 of the upper platen 212 and lower platen 210, and thereby allowing the film tube 204 to be released onto the sock-bladder assembly 140 to form a film-sock-bladder assembly 290 (FIG. 36).

Figure 35:
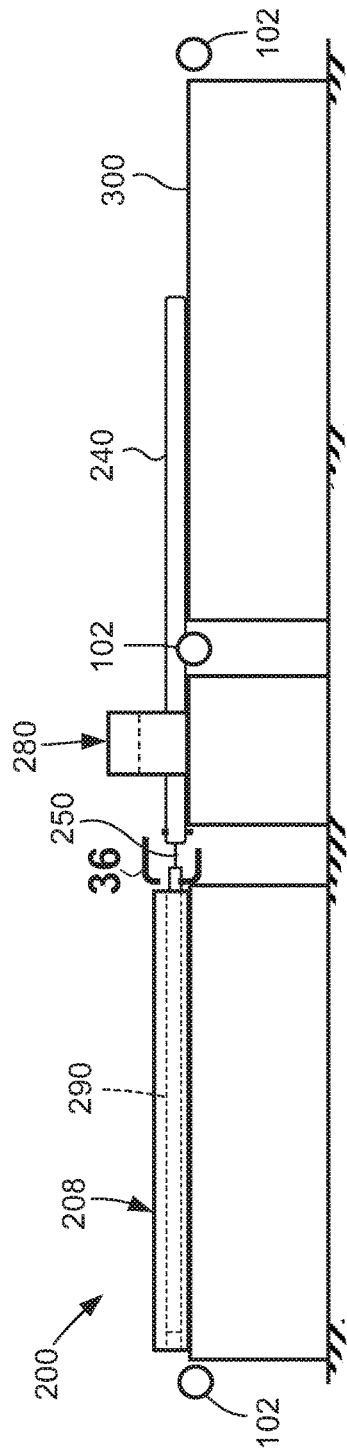
FIG. 35 is a side view of the tool-tube assembly pulling the sock-bladder assembly from the sock application station into the film tube of the platen assembly to form a film-sock-bladder assembly.

Referring to FIGS. 35-38, shown in FIG. 35 is a side view of a portion of the system 100 showing the film application station 200 and the bladder assembly end preparation platform 300. Also shown is the film-sock-bladder assembly 290 positioned within the platen assembly 208, and coupled (FIG. 36) via the bladder-tool connector mechanism 250 to the bladder pull tool 240 which is shown extending through a heat shrink device 280 and is partially supported on the bladder assembly end preparation platform 300. As shown in FIG. 36, the film 202 may extend at least partially beyond the end of the end fitting 426 at the downstream end of the bladder 420. Prior to the film-sock-bladder assembly 290 being pulled by the bladder pull tool 240 through the heat shrink device 280, the bladder pull tool 240 may be temporarily detached from the end fitting 426 at the downstream end of the bladder 420 as shown in FIG. 37. For example, the ball lock pin 252 of the bladder-tool connector mechanism 250 may be disengaged and removed from the pressure port 428 in the end fitting 426 of the bladder 420.

Referring to FIGS. 37-38, the portion of the film 202 extending beyond the end of the end fitting 426 may be gathered around and/or folded over onto the sock overhang 128 against the end fitting 426, as shown in FIG. 37. In FIG. 38, the bladder-tool connector mechanism 250 may be re-coupled to the end fitting 426 of the bladder 420. For example, the ball lock pin 252 may be reinserted into the pressure port 428 in the end fitting 426 such that the end clamping plate 254 clamps the film 202 and the breather sock 124 against the exterior end face of the end fitting 426. The end clamping plate 254 may prevent the film 202 and the breather sock 124 from slipping off the bladder 420 as the bladder pull tool 240 pulls, via the drive rollers 102, the film-sock-bladder assembly 290 out of the platen assembly 208 and toward the bladder assembly end preparation platform 300.

Figure 39:
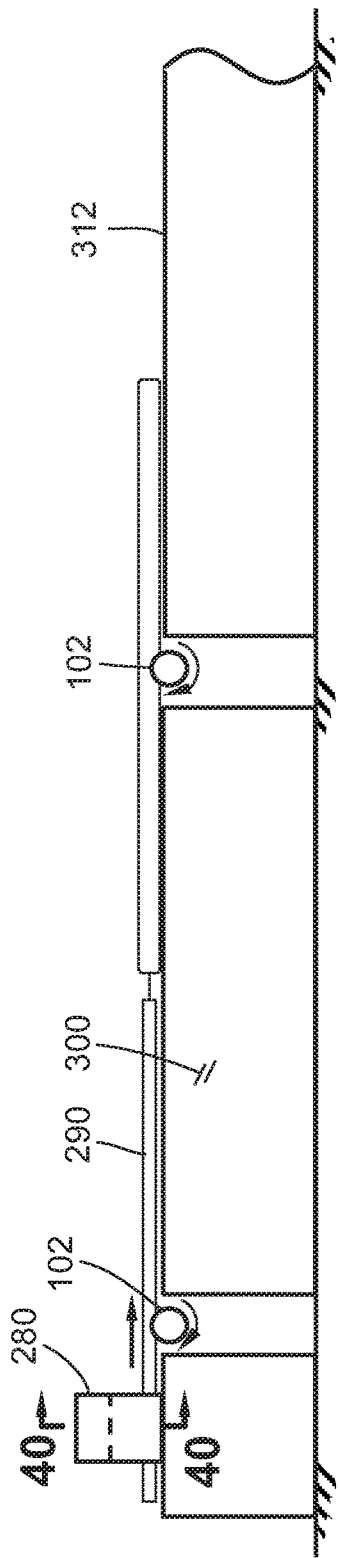
FIG. 39 is a side view of the bladder pull tool pulling the film-sock-bladder assembly through a heat shrink device configured to heat a shrink wrap film of the film-sock-bladder assembly in a manner to shrink the shrink wrap film and compress the breather sock against bladder side surfaces of the bladder.
Figure 40:
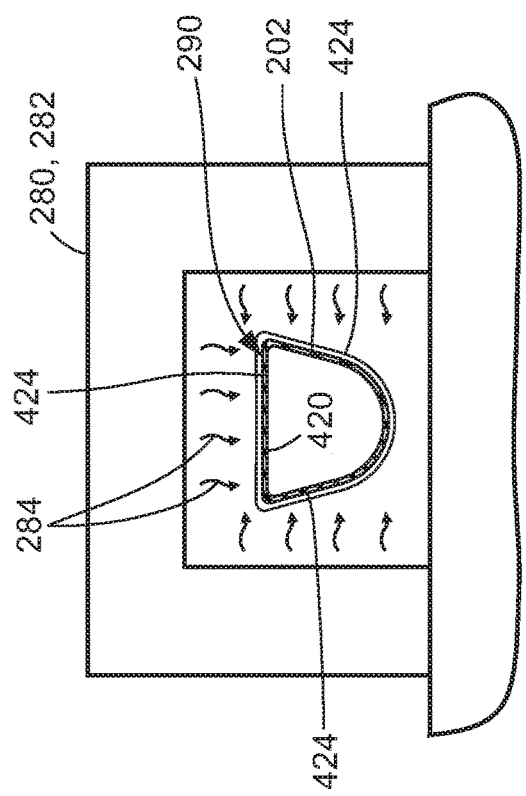
FIG. 40 is a transverse sectional view of the film-sock-bladder assembly inside the heat shrink device.

Referring to FIGS. 39-40, shown in FIG. 39 is a side view of a portion of the system 100 showing the film-sock-bladder assembly 290 passing through the heat shrink device 280 when moving, via the drive rollers 102, onto the bladder assembly end preparation platform 300 while being pulled by the bladder pull tool 240, which is being moved, via the drive rollers 12, onto the wrap ply forming bed 312. As mentioned above, the film 202 may comprise a shrink wrap film. The heat shrink device 280 may apply heat 284 to the shrink wrap film of the film-sock-bladder assembly 290 in a manner to shrink or contract the shrink wrap film and thereby compress the shrink wrap film and breather sock 124 against the bladder side surfaces 424 of the bladder 420. In the example of FIG. 40, the heat shrink device 280 may be a heat shrink oven 282 through which the film-sock-bladder assembly 290 may be passed for locally applying heat 284 to the shrink wrap film of the film-sock-bladder assembly 290. Alternatively, the heat shrink device 280 may comprise one or more heat guns (not shown) that may be passed over the film-sock-bladder assembly 290 or held stationary while the film-sock-bladder assembly 290 is moved in a downstream direction.

Referring to FIGS. 41-44, shown in FIG. 41 is a side view of a portion of the system 100 including the bladder assembly end preparation platform 300 and the wrap ply forming bed 312. The film-sock-bladder assembly 290 is shown supported on the bladder assembly end preparation platform 300, and the bladder pull tool 240 is shown supported on the wrap ply forming bed 312. The bladder assembly end preparation platform 300 may be located immediately downstream of the heat shrink device 280 (FIG. 39). As shown in FIG. 42, the bladder assembly end preparation platform 300 may include a lengthwise notch 308 for stably supporting the film-sock-bladder assembly 290. As shown in FIG. 43, the bladder pull tool 240 may be coupled to the downstream end of the film-sock-bladder assembly 290 by the bladder-tool connector mechanism 250. FIG. 44 shows the ball lock pin 252 of the bladder-tool connector mechanism 250 after being removed from the pressure port 428 of the end fitting 426 of the bladder 420 for decoupling the bladder pull tool 240 from the film-sock-bladder assembly 290. Also shown in FIG. 44 is the optional installation of an end clamping element 302 onto one or both of the opposing ends of the film-sock-bladder assembly 290. Each clamping element may comprise a cord, a wire, a twist tie, or other similar device for cinching the portions of the film 202 and breather sock 124 overhanging the end fittings 426 of the bladder 420. The end clamping elements 302 may restrict or prevent movement of the film 202 and breather sock 124 relative to relative to the bladder 420 during the application of composite wrap plies 362 (FIG. 71) over the film-sock-bladder assembly 290, as described below.

Referring to FIGS. 45-47, shown in FIG. 45 is a side view of a portion of the system 100 including the bladder assembly end preparation platform 300 and the wrap ply forming bed 312. FIG. 46 is a sectional view of the wrap ply forming bed 312 showing the pull tool storage rack 304 located adjacent to the wrap ply forming bed 312. FIG. 47 is a top view of the wrap ply forming bed 312 and the pull tool storage rack 304. The system 100 may include a bladder transfer mechanism 386 for transferring the bladder pull tool 240 onto the pull tool storage rack 304 after the bladder pull tool 240 has been decoupled (FIG. 44) from the film-sock-bladder assembly 290. In the example shown, the bladder transfer mechanism 386 may comprise a lifting beam 388 having vacuum suction cups 390 located at spaced intervals along the length of the lifting beam 388 for vacuum coupling to the bladder pull tool 240. The lifting beam 388 may be suspended from an overhead crane or gantry (not shown) which may be controlled by an operator or technician for operated-assisted transferring of the bladder pull tool 240 from the wrap ply forming bed 312 onto the pull tool storage rack 304. As an alternative to a lifting beam 388, the bladder transfer mechanism 386 may be transferred by a pick-and-place system (not shown), or other transfer mechanism. Alternatively, for bladder pull tools 240 that are relatively lightweight, the bladder 420 to pull tool may be manually lifted and transferred onto the pull tool storage rack 304 by one or more technicians.

Referring to FIGS. 46-47, the pull tool storage rack 304 may include a lengthwise notch 308 for stably supporting the bladder pull tool 240. In addition, the bladder pull tool 240 may be configured to store a plurality of several different configurations of bladder pull tools 240, with each bladder pull tool 240 configuration corresponding to a different configuration of the bladder 420. In the example of FIGS. 46-47, the pull tool storage rack 304 may include one or more shelves 306 for storing a plurality of bladder pull tools 240 for each of three (3) different configurations (e.g., different cross-sectional shape and/or size) of the bladder pull tool 240 corresponding to three (3) different configurations of the bladder 420. In the presently-disclosed example of the system 100, four (4) bladder pull tools 240 of the same configuration are required for processing each bladder 420 configuration. For a system 100 configured to process three (3) different bladder configurations, the bladder pull tool 240 may be required to store a total of at least eight (8) bladder pull tools 240, not including the four (4) pull tools currently in use by the system 100. As mentioned above, the system 100 may be configured for processing any one of a variety of different bladder configurations, and is not limited to processing three (3) different bladder configurations. As shown in FIGS. 2 and 47, each bladder pull tool 240 may be transferred, via the drive rollers 102, from the pull tool storage rack 304 back to the film inflation platform 270 for reinstallation of another film tube 204 (FIGS. 21-23) for processing of another bladder 420 received from the bladder staging station 104.

Referring to FIGS. 48-50, shown in FIG. 48 is a side view of the composite ply application station 310. As mentioned above, the composite ply application station 310 is located downstream of the film application station 200 (FIGS. 1-2) and includes a wrap ply forming bed 312. FIG. 48 also shows the bladder transfer mechanism 386 (e.g., a lifting beam 388 having vacuum suction cups 390) positioned over the film-sock-bladder assembly 290. As shown in FIGS. 49-50, the wrap ply forming bed 312 has at least one forming bed opening 314. The wrap ply forming bed 312 is configured to receive one or more composite wrap plies 362 to result in a wrap laminate 364. Each of the composite wrap plies 362 may be a fibrous material that is pre-impregnated with resin (e.g., prepreg). In one example, the composite wrap plies 362 may be epoxy-impregnated carbon fiber plies.

Figure 54:
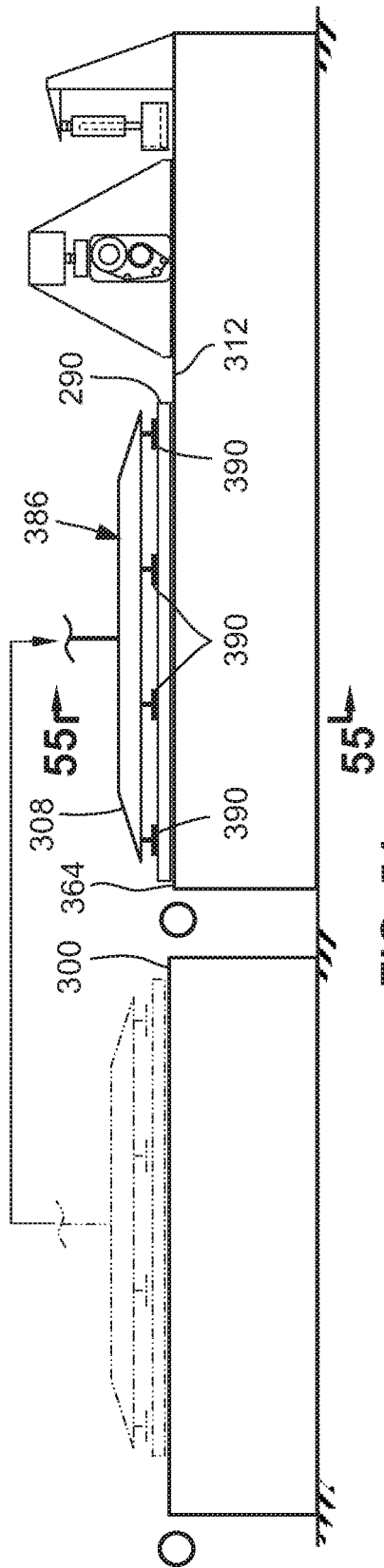
FIG. 54 is a side view of the bladder assembly end preparation platform and the composite ply application station, and showing the bladder transfer mechanism transferring the film-sock-bladder assembly from the bladder assembly end preparation platform to the wrap ply forming bed.
Figure 55:
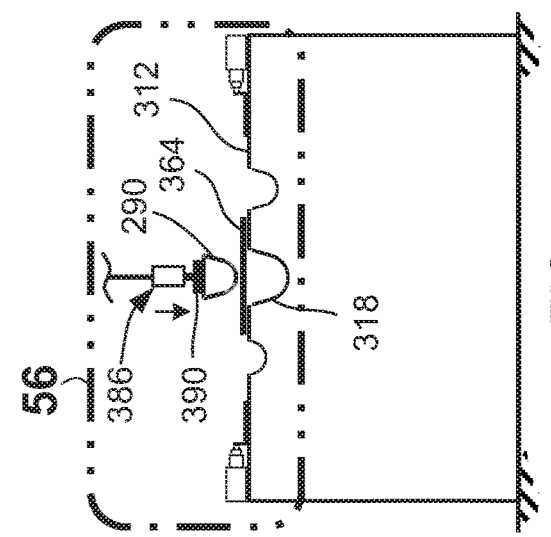
FIG. 55 is a transverse sectional view of the composite ply application station showing the film-sock-bladder assembly being lowered onto the wrap laminate.

In the example of FIGS. 49-50, the wrap ply forming bed 312 has three (3) forming bed openings 314 configured as die cavities 318 each having a cross-sectional shape that is complementary to the cross-sectional shape and size respectively of the three (3) different bladder configurations that may be processed by the presently-disclosed example of the system 100. In FIGS. 49-50, one of the die cavities 318 is contoured complementary to the cross-sectional shape and size of the bladder 420 that is supported on the bladder assembly end preparation platform 300. As shown in FIGS. 54-56 and described below, the wrap laminate 364 may be urged downwardly into one of the die cavities 318 by the film-sock-bladder assembly 290 until the wrap laminate 364 conforms to the cross-sectional shape of the die cavities 318. As shown in FIGS. 57-59 and described below, protruding portions of the wrap laminate 364 may be folded over into overlapping relation on the top of the bladder 420 to produce a ply-film-sock-bladder assembly 440.

Figure 66:
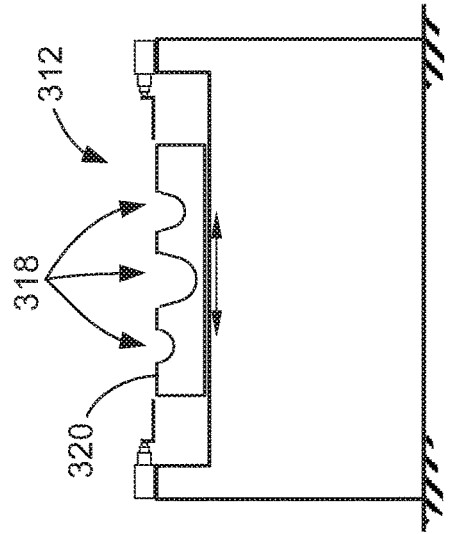
FIG. 66 is a transverse sectional view of a further example of a composite ply application station having a forming die having a forming bed opening (e.g., at least one die cavity) configured to receive the wrap laminate when urged downwardly into the forming bed opening by the film-sock-bladder assembly.

Although FIGS. 49-50 show each of the die cavities 318 contoured complementary to the cross-sectional shape of the bladder 420 (FIG. 59), in an example described below and shown in FIG. 66, the wrap ply forming bed 312 may be provided in a simplified configured having a forming bed opening 314 configured to support the wrap laminate 364 only at the uppermost opposing side edges 315 of the forming bed opening 314. The wrap laminate 364 may be provided in a width that allows the wrap laminate 364 to drape downwardly between the opposing side edges 315 of the forming bed opening 314 under the urging of the film-sock-bladder assembly 290 until the wrap laminate 364 approximately assumes the cross-sectional shape of the bladder 420.

FIGS. 48-50 show an example of a ply lamination head 330 configured to be translated along a lengthwise direction of the composite ply application station 310 for laying up the wrap laminate 364 on the wrap ply forming bed 312. The ply lamination head 330 is configured to dispense one or more wrap plies 362 of composite material 360 (FIG. 49) over one of the die cavities 318. However, in other examples of the system not shown, the ply lamination head 330 may be omitted, and the wrap laminate 364 may be manually laid up on the wrap ply forming bed 312.

In the example of FIGS. 47-50, the ply lamination head 330 may be supported on a head gantry 332 configured to move along the lengthwise direction of the composite ply application station 310. The composite ply application station 310 may include a device staging area 380 having one or more device stands 381 for temporarily storing a ply trimming device 382 while the ply lamination head 330 lays up the wrap laminate 364 on the wrap ply forming bed 312. The ply lamination head 330 may be supported on an upper beam 334 of the head gantry 332. The upper beam 334 may be cantilevered outwardly from a generally vertically oriented beam support 336 of the head gantry 332.

The head gantry 332 may be movably supported on one or more longitudinal tracks 338 extending along a lengthwise direction of the composite ply application station 310. In some examples, the ply lamination head 330 may be movable along a transverse direction (e.g., perpendicular to the longitudinal tracks 338) along the upper beam 334 to allow the ply lamination head 330 to be centered over one of the die cavities 318 having a cross-sectional shape and size that corresponds to the bladder 420 currently supported on the bladder assembly end preparation platform 300. In addition to longitudinal and transverse movement, the ply lamination head 330 may be rotatable about a vertical axis (not shown) and may also be vertically movable as may be required for starting and stopping the laying up of each course of composite wrap ply onto the wrap ply forming bed 312. However, the ply lamination head 330 may be supported by any one of a variety of different arrangements (e.g., a robotic arm) for moving the ply lamination head 330 during the laying up of the wrap laminate 364, and is not limited to the above-described head gantry 332 configuration.

In FIGS. 48 and 50, the ply lamination head 330 may include a mounting frame 340 coupled to the upper beam 334. The ply lamination head 330 may include a material supply drum 342 supporting a material roll of composite material 360 (e.g., prepreg) which may be backed by a backing layer. The ply lamination head 330 may further include a backing layer separation assembly 348 configured to separate the backing layer from the composite material 360. After separation from the composite material 360, the backing layer may be wound on a backing layer collection drum 346 as the composite material 360 is applied to the wrap ply forming bed 312. The ply lamination head 330 may further include a compaction device 350 such as a compaction roller or a compaction shoe for applying compaction pressure to the composite material 360 as the composite material 360 is dispensed from the ply lamination head 330 onto the wrap ply forming bed 312.

Referring to FIGS. 51-53, shown in FIG. 51 is a side view of the bladder assembly end preparation platform and the composite ply application station. FIG. 52 is a sectional view of the composite ply application station 310 showing an example of a ply trimming device 382 that may be included with the system 100 for trimming the wrap laminate 364 (FIGS. 52-53). Prior to trimming the wrap laminate 364, the head gantry 332 may transfer the ply lamination head 330 to the device staging area 380, and release the ply lamination head 330 to one of the device stands 381 before moving over to the other device stand 381 at the staging area 380, and coupling the head gantry 332 to the ply trimming device 382. FIG. 53 is a top view of the composite ply application station 310 showing the ply trimming device 382 positioned by the head gantry 332 at one of the ends of the wrap laminate 364 for trimming the wrap laminate 364 on the wrap ply forming bed 312. In the example shown, the ply trimming device 382 is configured as a stamp or punch trimming device configured to stamp-cut a relief notch 384 into each of opposing ends of the wrap laminate 364. However, the trimming device may be configured to form any one of a variety of geometric shapes on or in the wrap laminate 364, and is not limited to forming a relief notch 384 in the opposing ends of the wrap laminate 364. For example, the ply trimming device 382 may be configured as a laser trimming device (not shown) configured to emit a laser beam for trimming the sides and/or the ends of the wrap laminate 364 prior to the urging of the wrap laminate 364 into the die cavity 318 of the wrap ply forming bed 312, as described below.

Referring to FIGS. 54-56, after the wrap laminate 364 has been laid up on the wrap ply forming bed 312, the bladder transfer mechanism 386 is configured to lift the film-sock-bladder assembly 290 off of the bladder assembly end preparation platform 300 (e.g., FIG. 54). As mentioned above, the bladder transfer mechanism 386 may be configured as a lifting beam 388 suspended from an overhead crane (not shown). The lifting beam 388 may include vacuum suction cups 390 for vacuum engagement to the film-sock-bladder assembly 290. After lifting the film-sock-bladder assembly 290 off of the bladder assembly end preparation platform 300, the lifting beam 388 may lower the film-sock-bladder assembly 290 onto the wrap laminate 364 (e.g., FIG. 55) for urging the wrap laminate 364 into the die cavity 318 of the wrap ply forming bed 312 (e.g., FIG. 56). As shown in FIG. 56, the wrap laminate 364 may be laid up at a width such that when the wrap laminate 364 is urged by the film-sock-bladder assembly 290 into the cross-sectional shape of the die cavity 318, a first protruding portion 366 and a second protruding portion 368 of the wrap laminate 364 protrudes outwardly from opposite sides of the die cavity 318.

Referring to FIGS. 53 and 57-59, the composite ply application station 310 may include a wrap ply folding mechanism 400 including a first wrap ply folding plate 402 and a second wrap ply folding plate 404 mounted respectively on opposite sides of the wrap ply forming bed 312, and configured to respectively fold the first protruding portion 366 and second protruding portion 368 into overlapping relation with each other on top of the film-sock-bladder assembly 290. The first wrap ply folding plate 402 and the second wrap ply folding plate 404 may each be configured as relatively rigid (e.g., non-flexible or non-bendable) members. The first wrap ply folding plate 402 and the second wrap ply folding plate 404 may each be independently actuated by one or more folding plate actuators 406. The folding plate actuators 406 may be configured as telescopic mechanisms configured to extend and retract the folding plates as shown in FIGS. 57-59. However, the system 100 may include any one of a variety of different arrangements for folding the first protruding portion 366 and second protruding portion 368 into overlapping relation with each other on top of the film-sock-bladder assembly 290. For example, although not shown, the system 100 may include opposing pivoting plates (not shown) for respectively folding the first protruding portion 366 and second protruding portion 368 over on top of the film-sock-bladder assembly 290.

FIG. 56 shows the first wrap ply folding plate 402 and the second wrap ply folding plate 404 in a retracted position 410. FIG. 57 shows the lifting beam 388 (FIG. 56) removed from the film-sock-bladder assembly 290, and the first wrap ply folding plate 402 moved into an extended position 412 which causes the first wrap ply folding plate 402 to fold the first protruding portion 366 of the wrap laminate 364 over on top of the film-sock-bladder assembly 290. FIG. 58 shows the second wrap ply folding plate 404 moved into an extended position 412, and which causes the second wrap ply folding plate 404 second to fold the second protruding portion 368 of the wrap laminate 364 over on top of the first protruding portion 366 to result in a wrap ply lap joint 370 (FIGS. 59 and 62). The second wrap ply folding plate 404 may include a heating element 408 for locally applying heat 284 for tacking together the first protruding portion 366 and the second protruding portion 368.

The heating element 408 may locally heat 284 the resin in the overlapping portions of the first protruding portion 366 and the second protruding portion 368 causing softening and intermingling of the resin in the first protruding portion 366 and second protruding portion 368. Upon cooling of the resin, the overlapping portions of the first protruding portion 366 and the second protruding portion 368 may remain tacked together, which may thereby secure the wrap laminate 364 to the film-sock-bladder assembly 290. In one example, the heating element 408 may be configured as a resistive wire mounted to or incorporated into the second wrap ply folding plate 404. After tacking together the first protruding portion 366 and the second protruding portion 368 at the wrap ply lap joint 370, the first wrap ply folding plate 402 and the second wrap ply folding plate 404 may each be moved to the retracted position 410 as shown in FIG. 59. The lifting beam 388 may be vertically lowered and vacuum pressure may be applied to the vacuum suction cups 390 for vacuum coupling to the ply-film-sock-bladder assembly 440 to thereby allow the lifting beam 388 to lift the ply-film-sock-bladder assembly 440 out of the die cavity 318.

Figure 60:
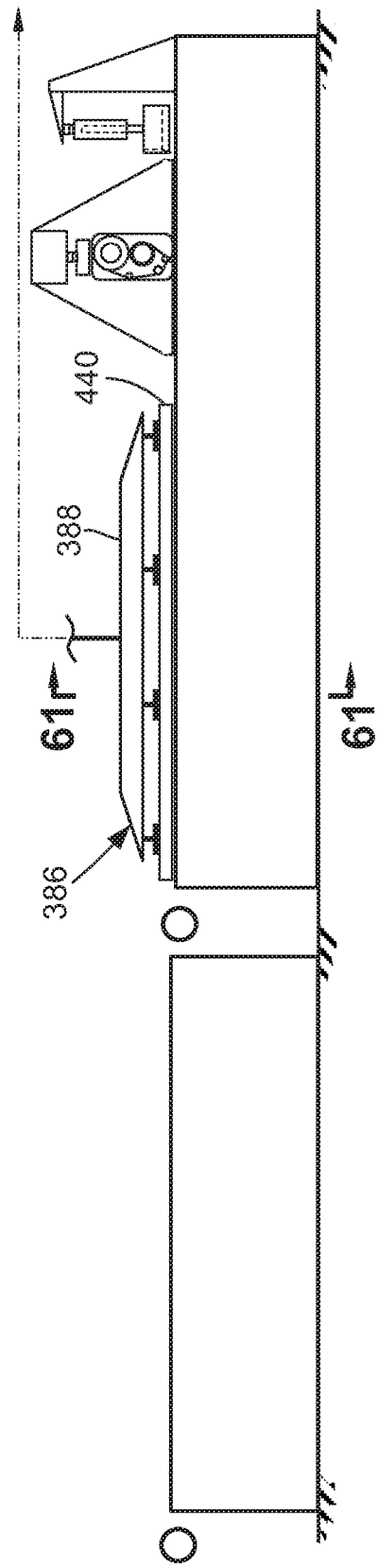
FIG. 60 is a side view of the bladder assembly end preparation platform and the composite ply application station, and showing the bladder transfer mechanism removing the ply-film-sock-bladder assembly from the die cavity.
Figure 61:
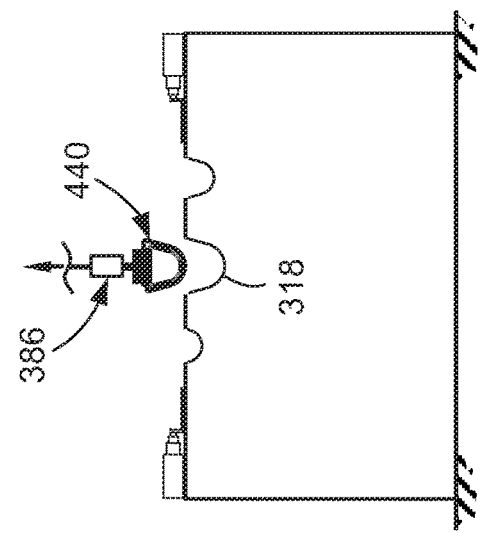
FIG. 61 is a transverse sectional view of the composite ply application station showing the bladder transfer mechanism removing the ply-film-sock-bladder assembly from the die cavity.

Referring to FIGS. 60-62, shown in FIGS. 60-61 is the bladder transfer mechanism 386 (e.g., the lifting beam 388) removing the ply-film-sock-bladder assembly 440 from the die cavity 318. Although not shown, the bladder transfer mechanism 386 may move the ply-film-sock-bladder assembly 440 to a bladder kitting station for final preparation prior to installation of the ply-film-sock-bladder assembly 440 into a stringer cavity 458 (FIG. 71) of a composite stringer 456. FIG. 62 shows an example of a ply-film-sock-bladder assembly 440 in which the wrap laminate 364, the film 202, and the breather sock 124 are partially cut away to show the layers of the assembly surrounding the bladder body 422 and the end fittings 426 of the bladder 420.

Figure 64:
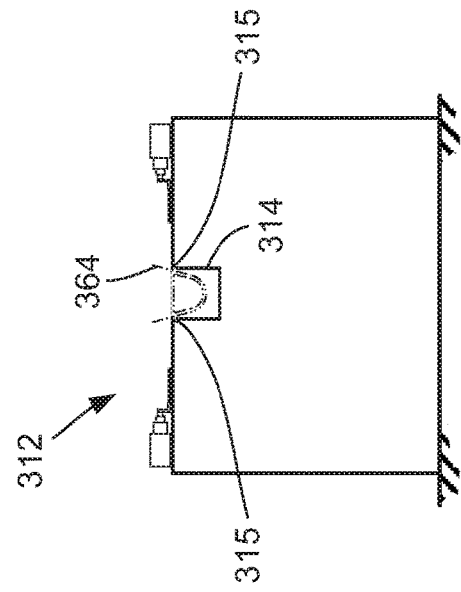
FIG. 64 is a transverse sectional view of a further example of a composite ply application station configured to receive one of a plurality of replaceable forming dies each having a single die cavity.
Figure 63:
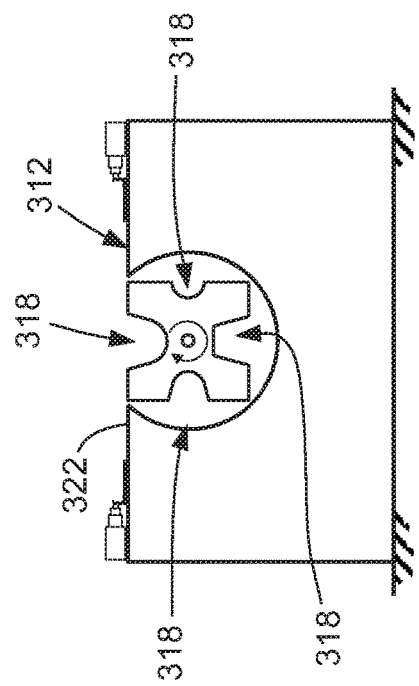
FIG. 63 is a transverse sectional view of the composite ply application station taken along Line 63-63 of FIG. 62, and showing an example of a rotatable forming die containing a plurality of die cavities of different sizes and/or shapes.

Referring to FIGS. 63-66, shown are examples of alternative configurations of the wrap ply forming bed 312 for accommodating different bladder configurations. FIG. 63 shows an example of a rotatable forming die 322 having a plurality of uniquely shaped die cavities 318 each corresponding to the cross-sectional shape and/or size of a bladder 420 (FIG. 62) that the system 100 is capable of processing. FIG. 64 shows an example of a horizontally translatable forming die 320 having a plurality of die cavities 318, and which is horizontally movable within a recess to allow for centering or aligning one of the die cavities 318 with the ply lamination head 330 (FIG. 48), which may be non-movable in a transverse direction (e.g., perpendicular to the lengthwise direction of the composite ply application station 310).

Figure 65:
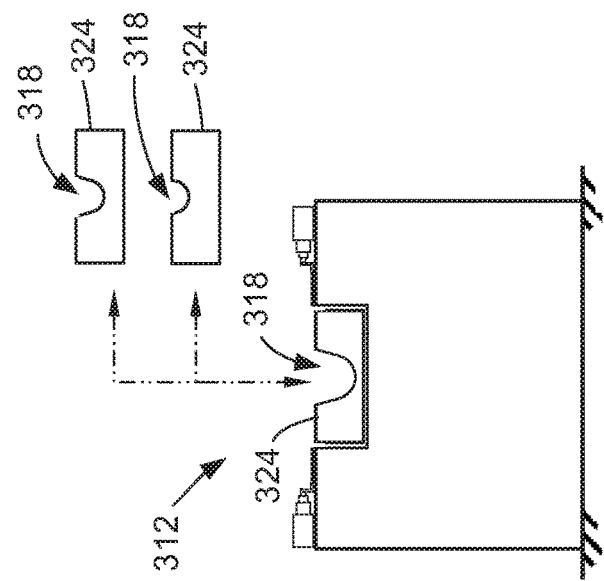
FIG. 65 is a transverse sectional view of a further example of a composite ply application station having a horizontally translatable forming die containing a plurality of die cavities of different sizes and/or shapes.

FIG. 65 shows an example of a composite ply application station 310 having a recess configured to receive a replaceable forming die 324 containing a single die cavity 318. The replaceable forming die 324 may be removed and replaced with any one of a variety of other replaceable forming dies 324 each having a single, uniquely-shaped or sized die cavity 318. Any one of the above-described wrap ply forming bed configurations may be implemented for laying up, trimming, and forming a wrap laminate 364 in a manner similar to the above-described operations shown in FIGS. 48-59. FIG. 66 shows an example of a wrap ply forming bed 312 having a forming bed opening 314 configured to support a wrap laminate 364 only at the opposing side edges 315 of the forming bed opening 314. As mentioned above, the film-sock-bladder assembly 290 may urge the wrap laminate 364 downwardly into the forming bed opening 314 to drape form the wrap laminate 364 at least partially around the film-sock-bladder assembly 290.

Figure 67:
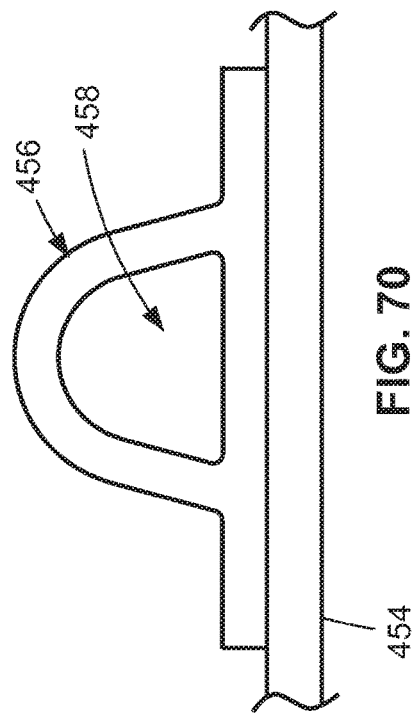
FIG. 67 is a perspective view of an example of an aircraft formed at least partially of composite material.
Figure 68:
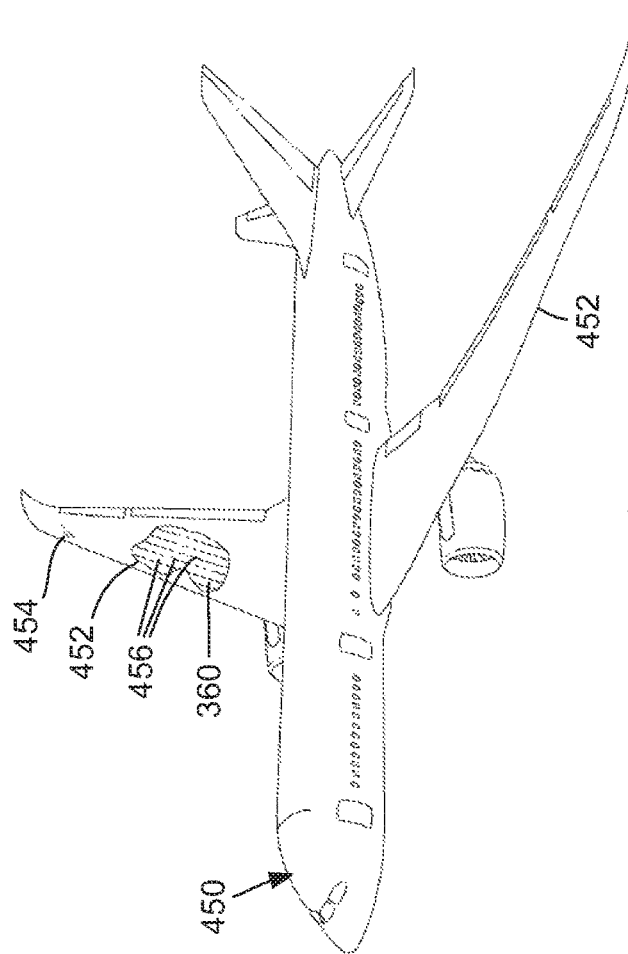
FIG. 68 is a perspective view of an example of a composite wing panel comprised of a composite skin panel and a plurality of composite stringers.
Figure 69:
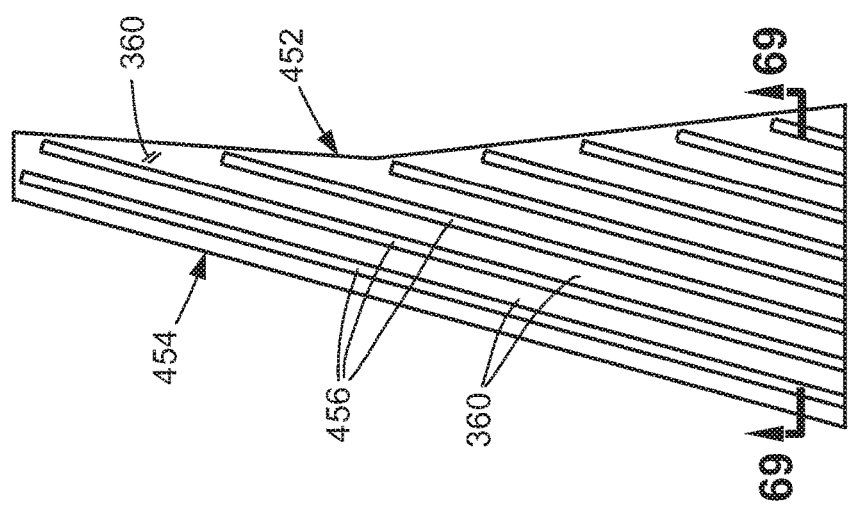
FIG. 69 is a cross-sectional view taken along Line 69 of FIG. 68 and showing the composite stringers co-cured or co-bonded to the composite skin panel.

Referring to FIGS. 67-71, shown in FIG. 67 is example of an aircraft 450 which may include one or more components formed of composite material 360. FIG. 68 shows an example of a composite skin panel 454 of a composite wing 452 of the aircraft 450. A plurality of longitudinally extending composite stringers 456 are located on the skin inner surface. The composite skin panel 454 and/or the composite stringers 456 may be manufactured using one or more ply-film-sock-bladder assemblies 440 produced using the presently-disclosed system 100 (FIGS. 1-2) and method 500 (FIG. 72). FIG. 69 is a sectional view of the composite skin panel 454 of a composite wing 452, and showing a plurality of composite stringers 456 mounted on the skin inner surface. FIG. 70 is an enlarged view of one of the composite stringers 456 co-cured or co-bonded to the composite skin panel 454. FIG. 71 shows an example of a ply-film-sock-bladder assembly 440 protruding from a stringer cavity 458 of a composite stringer 456 that may be formed and/or cured using the ply-film-sock-bladder assembly 440. The composite stringer 456 may be manufactured by assembling and co-curing a cover laminate 460 and a base laminate 462 with the wrap laminate 364 of the ply-film-sock-bladder assembly 440.

Referring to FIG. 72, shown is a flowchart of operations included in a method 500 of preparing a bladder 420 for use in manufacturing a composite stringer 456. The method 500 may include storing a plurality of bladders 420 at a bladder staging station 104 which may be located upstream of the sock application station 106. The method 500 may additionally include activating a plurality of drive rollers 102 for pulsing movement of the bladder 420 station-to-station through the system 100 for performing the below-described steps for preparing the bladder 420. As mentioned above, the starting and stopping of the drive rollers 102 may be controlled by a controller (not shown), which may also control the operation of the various components of the sock application station 106, the film application station 200, and the composite ply application station 310.

Step 502 of the method 500 includes progressively applying, using a sock cartridge 110 at the sock application station 106, a breather sock 124 of breather material in tubular form onto the bladder 420 as the bladder 420 exits the sock cartridge 110 to thereby result in a sock-bladder assembly 140. The step 502 of progressively applying the breather sock 124 onto the bladder 420 may comprise supporting a gathered arrangement 126 of the breather sock 124 on a cartridge body outer surface 114 of a tubular cartridge body of the sock cartridge 110. The upstream end of the breather sock 124 may be butted up against a sock backstop 116 protruding outwardly from the cartridge body outer surface 114. The breather sock 124 may be installed on the cartridge body outer surface 114 in a sock length that is at least as long as the bladder length. As indicated above, the sock cartridge 110 has a hollow cartridge interior 112 and may be supported on a cartridge support stand 108. The breather sock 124 may be installed on the sock cartridge 110 such that a portion of the breather sock 124 extends over a downstream end of the cartridge body to form a sock overhang 128, as described above and shown in FIG. 10. The method 500 may include engaging the sock overhang 128 with a downstream end of the bladder 420 as the bladder 420 exits the cartridge interior 112, and thereby causing the breather sock 124 to be progressively pulled off the cartridge body outer surface 114 and onto the bladder 420 as shown in FIG. 12.

The method 500 may further comprise cutting, using a sock cutting device 150 located downstream of the sock cartridge 110, the breather sock 124 after a downstream end of the sock-bladder assembly 140 exits the sock cartridge 110 as shown in FIGS. 15-17. The breather sock 124 may be cut as a means to separate the breather sock 124 on the bladder 420 from the breather sock 124 remaining on the sock cartridge 110. The breather sock 124 may be cut to a sock length that result in the breather sock 124 extending slightly past the upstream end of the bladder 420 after the upstream end exits the sock cartridge 110. However, for examples where the breather sock 124 is installed on the sock cartridge 110 in the sock length that is complementary to the bladder 420 length, the step of cutting the breather sock 124 may be omitted.

In some examples, the method 500 may include autonomously (e.g., without human intervention) replacing the sock cartridge 110 when empty. In this regard, the method 500 may include sensing, via a sensor (not shown), that the bladder 420 has passed through the sock cartridge 110 and/or that the cartridge body outer surface 114 is devoid of breather sock 124. The method 500 may include removing and replacing an empty sock cartridge 182 with a loaded sock cartridge 184 in preparation for a next bladder 420 to be passed through the sock application station 106 as shown in FIGS. 18-20. The method 500 may comprise transferring, using a cartridge transfer mechanism, the empty sock cartridge 182 from the cartridge support stand 108 to a cartridge reloading stand 180, which may be located adjacent to the cartridge support stand 108. The method 500 may include loading breather material onto the empty sock cartridge 182 from a breather material spool 186 located at the cartridge reloading stand 180. The cartridge reloading stand 180 may support at least one loaded sock cartridge 184 for replacing an empty sock cartridge 182 on the cartridge support stand 108.

Step 504 of the method 500 includes inflating, at the film application station 200, a film 202 from a flat shape into an open film tube 204, as shown in FIGS. 21-24. The film 202 in the flat shape may initially be wound on a film material spool 274. When inflated, the film tube 204 is open at both ends. The film tube 204 preferably has a film length that is at least as long as the bladder length such that when installed over the sock-covered bladder 420, the film tube 204 extends beyond each of the opposing ends of the bladder 420.

Step 504 of inflating the film 202 may comprise injecting air into the film 202 while inserting a bladder pull tool 240 to result in a tool-tube assembly 260 as shown in FIGS. 21-24. For example, air from a pressurized air source 244 may be injected into an air injection port 242 located in a downstream end of the bladder pull tool 240. The method may include supporting the film 202 and/or the bladder pull tool 240 on a film inflation platform 270 while air is injected into the film 202 during insertion of the bladder pull tool 240. As described above, the film inflation platform 270 may include a film storage rack 272 supporting at least one film material spool 274 containing a continuous length of film 202 for sequential installation over a series of bladder pull tools 240.

Step 506 of the method 500 includes moving the sock-bladder assembly 140 into the film tube 204 to thereby result in a film-sock-bladder assembly 290. The step 506 of moving the sock-bladder assembly 140 into the film tube 204 may initially comprise positioning the film tube 204 between the lower platen 210 and the upper platen 212 of the platen assembly 208 in an open position 214 as shown in FIGS. 25-26. As described above, the lower platen 210 and the upper platen 212 may each include a platen surface 220 having a plurality of apertures 222 as shown in FIG. 28. The positioning of the film tube 204 between the lower platen 210 and the upper platen 212 may comprise positioning the tool-tube assembly 260 between the lower platen 210 and the upper platen 212 in the open position 214, followed by mating the upper platen 212 to the lower plate to define a platen cavity 226 open on opposite ends. With the upper platen 212 and lower platen 210 in the assembled position 216 and defining the platen cavity 226, the method 500 may include activating a vacuum pressure source 228 for generating suction force 224 at the apertures 222 (FIG. 29), and thereby vacuum coupling opposing sides of the film tube 204 against the platen surface 220 respectively of the lower platen 210 and the upper platen 212. The vacuum coupling of opposing sides of the film tube 204 against the platen surfaces 220 may prevent movement of the film tube 204 during removal of the bladder pull tool 240 from the film tube 204 and subsequent insertion of the sock-bladder assembly 140 into the film tube 204.

Prior to performing step 506 of moving the sock-bladder assembly 140 into the film tube 204, the method 500 may include removably coupling an upstream end of the bladder pull tool 240 to a downstream end of the sock-bladder assembly 140. Coupling of the bladder pull tool 240 to the sock-bladder assembly 140 may be facilitated by a bladder-tool connector mechanism 250 as shown in FIGS. 31-32. In the example described above, the bladder-tool connector mechanism 250 may comprise a ball lock pin 252 that may be coupled to the upstream end of the bladder pull tool 240 by a cable 256. The method 500 may include inserting the ball lock pin 252 into a pressure port 428 in the end fitting 426 on the downstream end of the bladder 420, and which may result in the clamping of the sock overhang 128 against the exterior face of the end fitting 426 of the bladder 420, as described above.

With the bladder pull tool 240 coupled to the sock-bladder assembly 140, the method 500 may include pulling, using the bladder pull tool 240, the sock-bladder assembly 140 from the sock application station 106 into the film tube 204 which, as described above, is vacuum coupled to the lower platen 210 and the upper platen 212. As shown in the figures, the sock-bladder assembly 140 and/or the bladder pull tool 240 may be engaged to at least one of the drive rollers 102, such that activation of the drive rollers 102 causes movement of the bladder pull tool 240 out of the film tube 204 (e.g., platen cavity 226), and movement of the sock-bladder assembly 140 into the film tube 204. Once the sock-bladder assembly 140 is inside the film tube 204, the method 500 may include deactivating the vacuum pressure source 228 in order to release the film tube 204 from the lower platen 210 and the upper platen 212 onto the sock-bladder assembly 140, and thereby forming a film-sock-bladder assembly 290 as shown in FIG. 36.

Prior to moving the film-sock-bladder assembly 290 out of the film tube 204 and onto the bladder assembly end preparation platform 300, the method 500 may include temporarily detaching the bladder pull tool 240 from the bladder 420 which, as shown in FIG. 36, are coupled together via the ball lock pin 252 which is inserted into the pressure port 428 of the end fitting 426 of the bladder 420. As shown in FIG. 37, the method 500 may include folding the film tube 204 over onto the sock overhang 128 which is disposed against the exterior face of the end fitting 426 of the bladder 420. As shown in FIG. 38, the method may include reattaching the bladder pull tool 240 to the bladder 420 by inserting the ball lock pin 252 into the pressure port 428 of the bladder 420 in a manner clamping both the sock overhang 128 and the film 202 against the end fitting 426. Clamping the breather sock 124 and the film 202 against the end fitting 426 may prevent the breather sock 124 and the film 202 from slipping off of the bladder 420 as the film-sock-bladder assembly 290 is moved through the stations of the system 100.

In examples where the film 202 is a shrink wrap film, the method 500 may comprise heating, using a heat shrink device 280, the film-sock-bladder assembly 290 in a manner to shrink the shrink wrap film. Heating of the film-sock-bladder assembly 290 may be performed by moving the film-sock-bladder assembly 290 through a heat shrink oven 282 (FIGS. 39-40) located downstream of the platen assembly 208. Alternatively or additionally, heating of the film-sock-bladder assembly 290 may be performed by passing one or more heating guns (not shown) over the film-sock-bladder assembly 290. Heating of the shrink wrap film may result in the shrink wrap film compressing the breather sock 124 against the bladder side surfaces 424

The bladder pull tool 240 may pull the film-sock-bladder assembly 290 out of the heat shrink device 280 and onto the bladder assembly end preparation platform 300, with the bladder pull tool 240 being supported on the wrap ply forming bed 312. With the film-sock-bladder assembly 290 supported on the bladder assembly end preparation platform 300, the method 500 may include decoupling the bladder pull tool 240 from the film-sock-bladder assembly 290 as shown in FIGS. 43-44. The method 500 may include transferring the bladder pull tool 240 from the wrap ply forming bed 312 to the pull tool storage rack 304 located adjacent to the wrap ply forming bed 312 as shown in FIGS. 45-47. In the example shown, the transferring of the bladder pull tool 240 may be performed using a lifting beam 388, although other means including manual means may be used for transferring the bladder pull tool 240.

As shown in FIGS. 43-44, the method 500 may additionally include gathering the overhanging ends of the breather sock 124 and the film 202 extending beyond the end fittings 426 on each of opposing ends of the bladder 420. The method 500 may additionally include installing an end clamping element 302 such as a cord, a wire, or a twist tie around each of the gathered ends as a means to restrict or prevent axial movement of the breather sock 124 and the film 202 relative to each other and relative to the bladder 420 during the below-described application of wrap plies 362. In addition, the end clamping elements 302 may restrict or prevent movement of the breather sock 124 and the film 202 during assembly of the ply-film-sock-bladder assembly 440 with the cover laminate 460 (FIG. 71) and base laminate 462 (FIG. 71) of the composite stringer 456 (FIG. 71), and/or during consolidation and/or curing of the composite stringer 456.

With the bladder pull tool 240 removed from the wrap ply forming bed 312, step 508 of the method 500 includes receiving, at the composite ply application station 310, one or more wrap plies 362 on the wrap ply forming bed 312 over the forming bed opening 314 to form a wrap laminate 364 as shown in FIGS. 49-50. For example, the wrap plies 362 may be laid up over a forming bed opening 314 which may be a die cavity 318 of a forming die 316. As described above, the wrap ply forming bed 312 may include at least one die cavity 318 having a cross-sectional shape and size that is complementary to the cross-sectional shape and size of the bladder 420. In the example shown, step 508 of receiving the wrap plies 362 over the forming bed opening 314 may include dispensing, using the above-described ply lamination head 330, one or more wrap plies 362 of composite material 360 over the forming bed opening 314 of the die cavity 318 to form the wrap laminate 364.

After performing step 508 of receiving the wrap plies 362 over the forming bed opening 314, the method 500 may optionally include trimming (e.g., FIGS. 51-53), using a ply trimming device 382 the wrap laminate 364 prior to urging the wrap laminate 364 into the forming bed opening 314. In one example, trimming of the wrap laminate 364 may be performed by punch trimming the wrap laminate 364 using a stamp or punch trimming device. In the example shown, the punch trimming device may stamp-cut a relief notch 384 into each of opposing ends of the wrap laminate 364. The relief notches 384 in each of opposing ends of the wrap laminate 364 may be shaped and sized complementary to the end fittings 426 of the bladder 420. However, as indicated above, the ply trimming device 382 may be provided in any one of a variety of configurations such as a laser trimming device configured to form any one of a variety of geometric shapes and sizes of cuts, profiles, holes and/or notches in the wrap laminate 364 prior to forming.

Step 510 of the method 500 includes urging, using the film-sock-bladder assembly 290, the wrap laminate 364 into the forming bed opening 314 (e.g., FIGS. 54-56) to produce a ply-film-sock-bladder assembly 440 (FIG. 59). In the example shown, the forming bed opening 314 may comprise one of several die cavities 318 that may be included in the wrap ply forming bed 312. The film-sock-bladder assembly 290 may be positioned on top of the wrap laminate 364 in alignment with or centered on the forming bed opening 314. The lifting of the film-sock-bladder assembly 290 off of the bladder assembly end preparation platform 300, and onto the wrap laminate 364 may be performed by the above-described bladder transfer mechanism 386 which may be configured as a lifting beam 388 having suction cups for vacuum engagement to the film-sock-bladder assembly 290. The weight or mass of the film-sock-bladder assembly 290 may urge the wrap laminate 364 into the forming bed opening 314, and may facilitate the wrap laminate 364 conforming to the cross-sectional shape of the die cavity 318. Alternatively or additionally, a vertically downward force (not shown) may be applied by the bladder transfer mechanism 386 to facilitate the urging of the film-sock-bladder assembly 290 and wrap laminate 364 into the die cavity 318.

After the wrap laminate 364 and the film-sock-bladder assembly 290 have been urged into the forming bed opening 314 (e.g., into the die cavity 318), the method 500 may include sequentially folding a wrap ply folding mechanism 400 to sequentially fold the first protruding portion 366 and the second protruding portion 368 of the wrap laminate 364 over each other on top of the film-sock-bladder assembly 290 to result in a wrap ply lap joint 370 as shown in FIGS. 57-59. For example, the method 500 may include moving a first wrap ply folding plate 402 from the retracted position 410 to the extended position 412 for folding the first protruding portion 366 of the wrap laminate 364 over on top of the film-sock-bladder assembly 290, followed by moving a second wrap ply folding plate 404 from the retracted position 410 to the extended position 412 for folding the second protruding portion 368 of the wrap laminate 364 on top of the first protruding portion 366 to result in the wrap ply lap joint 370. The method 500 may additionally include locally heating and tacking together (e.g., FIG. 59), using a heating element 408 of the second wrap ply folding plate 404, the first protruding portion 366 and the second protruding portion 368 at the wrap ply lap joint 370 to produce the ply-film-sock-bladder assembly 440 (FIG. 62). After forming the wrap ply lap joint 370, the method 500 may include lifting (FIGS. 60-61) the ply-film-sock-bladder assembly 440 off of the wrap ply forming bed 312 and transferring to a bladder kitting station (not shown) prior to assembly with a cover laminate 460 (FIG. 71) and a base laminate 462 (FIG. 71) for co-curing with the wrap laminate 364 (FIG. 71) to result in the composite stringer 456 (FIG. 71).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for preparing a bladder for use in manufacturing a composite stringer, comprising:
    a sock application station having a sock cartridge configured to progressively apply a breather sock of breather material in tubular form onto a bladder as the bladder exits the sock cartridge to thereby result in a sock-bladder assembly;
    a film application station located downstream of the sock application station and configured to inflate a film from a flat shape into an open film tube prior to application over the sock-bladder assembly to thereby result in a film-sock-bladder assembly; and
    a composite ply application station located downstream of the film application station and having a wrap ply forming bed containing at least one forming bed opening and configured to receive one or more wrap plies of a wrap laminate for urging into the forming bed opening by the film-sock-bladder assembly to produce a ply-film-sock-bladder assembly.

2. The system of claim 1, wherein:
    the sock cartridge has a tubular cartridge body including a hollow cartridge interior and a cartridge body outer surface configured to support a gathered arrangement of the breather sock in a sock length that is at least as long as a bladder length, and having a sock overhang extending over a downstream end of the cartridge body for engagement by a downstream end of the bladder upon exiting the cartridge interior and causing the breather sock to be progressively pulled off the cartridge body outer surface and onto the bladder.

3. The system of claim 1, wherein the film application station comprises:
    a platen assembly including a lower platen and an upper platen movable relative to each other between an open position and an assembled position and each including a platen surface having a plurality of apertures;
    the lower platen and the upper platen in the open position configured to receive the film tube, and the lower platen and the upper platen in the assembled position defining a platen cavity open on opposite ends; and
    the apertures in the lower platen and upper platen fluidly couplable to a vacuum pressure source for vacuum coupling opposing sides of the film tube respectively against the lower platen and upper platen as the sock-bladder assembly is moved into the film tube.

4. The system of claim 3, further comprising:
    a bladder pull tool having an air injection port fluidly couplable to a pressurized air source for inflating a length of the film to form the film tube allowing for insertion of the bladder pull tool to result in a tool-tube assembly;

the bladder pull tool configured to maintain a shape of the film tube during placement of the tool-tube assembly into the platen assembly and during vacuum engagement of the film tube to the lower platen and upper platen; and the bladder pull tool of the tool-tube assembly configured to be removably coupled to a downstream end of the breather sock and the bladder for pulling the sock-bladder assembly from the sock application station into an upstream end of the film tube as the bladder pull tool moves out of a downstream end of the film tube.

5. The system of claim 4, wherein the film application station further comprises:

a film inflation platform located adjacent to the platen assembly and configured to support the film during insertion of the bladder pull tool to result in the tool-tube assembly; and the film inflation platform including a film storage rack containing at least one film material spool for forming a next tool-tube assembly from a next bladder pull tool inserted into another length of the film.

6. The system of claim 1, wherein the film is a shrink wrap film, the film application station further comprises:

a heat shrink device configured to heat the shrink wrap film of the film-sock-bladder assembly in a manner to shrink the shrink wrap film and compress the breather sock against bladder side surfaces of the bladder.

7. The system of claim 1, wherein the composite ply application station further comprises:

a bladder assembly end preparation platform located downstream of the film application station and configured to receive the film-sock-bladder assembly after exiting the film application station;

a ply lamination head configured to dispense the one or more wrap plies onto the wrap ply forming bed to form the wrap laminate; and a bladder transfer mechanism configured to lift the film-sock-bladder assembly off of the bladder assembly end preparation platform, and lower the film-sock-bladder assembly on top of the wrap laminate for urging the wrap laminate and the film-sock-bladder assembly into the forming bed opening.

8. The system of claim 7, wherein the composite ply application station further comprises:

a wrap ply folding mechanism including a first wrap ply folding plate and a second wrap ply folding plate configured to respectively fold a first protruding portion and a second protruding portion of the wrap laminate over each other on top of the film-sock-bladder assembly to result in a wrap ply lap joint; and the second wrap ply folding plate having a heating element for locally heating and tacking together the first protruding portion and the second protruding portion at the wrap ply lap joint to produce the ply-film-sock-bladder assembly for installation in a stringer cavity of a composite stringer.

9. A system for preparing a bladder for use in manufacturing a composite stringer, comprising:

a sock application station having a sock cartridge configured to progressively apply a breather sock of breather material in tubular form onto a bladder as the bladder exits the sock cartridge to thereby result in a sock-bladder assembly;

a cartridge replacement mechanism configured to remove and replace an empty sock cartridge at the sock application station with a loaded sock cartridge containing the breather sock;

a film application station located downstream of the sock application station and configured to inflate a film from a flat shape into an open film tube prior to application over the sock-bladder assembly to thereby result in a film-sock-bladder assembly; and a composite ply application station located downstream of the film application station and having a wrap ply forming bed containing at least one forming bed opening, the wrap ply forming bed configured to receive one or more wrap plies of a wrap laminate for urging into the forming bed opening by the film-sock-bladder assembly to produce a ply-film-sock-bladder assembly.

10. A method of preparing a bladder for use in manufacturing a composite stringer, comprising:

progressively applying, using a sock cartridge at a sock application station, a breather sock of breather material in tubular form onto the bladder as the bladder exits the sock cartridge to thereby result in a sock-bladder assembly;

inflating, at a film application station located downstream of the sock application station, a film from a flat shape into an open film tube;

moving the sock-bladder assembly into the film tube to thereby result in a film-sock-bladder assembly;

receiving, at a composite ply application station located downstream of the film application station, one or more wrap plies to lay up a wrap laminate over a forming bed opening of a wrap ply forming bed; and urging, using the film-sock-bladder assembly, the wrap laminate into the forming bed opening to produce a ply-film-sock-bladder assembly.

11. The method of claim 10, wherein the sock cartridge has a cartridge holder, a tubular cartridge body including a hollow cartridge interior and a cartridge body outer surface, the step of progressively applying the breather sock onto the bladder comprises: supporting a gathered arrangement of the breather sock on the cartridge body outer surface of the tubular cartridge body supported on the cartridge holder and having the hollow cartridge interior, the breather sock having a sock overhang extending over a downstream end of the cartridge body; and engaging the sock overhang with a downstream end of the bladder exiting the cartridge interior and causing the breather sock to be progressively pulled off the cartridge body outer surface and onto the bladder.

12. The method of claim 11, further comprising: sensing that the cartridge body outer surface is devoid of the breather sock and thereby defining an empty sock cartridge; and removing and replacing the empty sock cartridge with a loaded sock cartridge in preparation for a next bladder to be passed through the sock application station.

13. The method of claim 12, further comprising:

transferring, using a cartridge replacement mechanism, the empty sock cartridge from the cartridge holder to a cartridge loading stand; and loading breather material onto the empty sock cartridge from a breather material spool located at the cartridge loading stand.

14. The method of claim 10, wherein moving the sock-bladder assembly into the film tube comprises:

positioning the film tube between a lower platen and an upper platen of a platen assembly in an open position, the lower platen and the upper platen each including a platen surface having a plurality of apertures;

mating the upper platen to the lower platen to define a platen cavity open on opposite ends;

activating a vacuum pressure source for generating vacuum pressure at the apertures; and vacuum coupling opposing sides of the film tube against the platen surface respectively of the lower platen and the upper platen to prevent movement of the film tube during insertion of the sock-bladder assembly.

15. The method of claim 14, wherein inflating the film tube and moving the sock-bladder assembly into the film tube comprises:

injecting air into the film while inserting a bladder pull tool to result in a tool-tube assembly;

positioning the tool-tube assembly between the lower platen and the upper platen prior to vacuum coupling the opposing sides of the film tube against the lower platen and the upper platen;

removably coupling an upstream end of the bladder pull tool to a downstream end of the sock-bladder assembly; and pulling the sock-bladder assembly from the sock application station into an upstream end of the film tube by pulling the bladder pull tool out of a downstream end of the film tube while vacuum coupled to the lower platen and the upper platen.

16. The method of claim 15, wherein inflating the film tube comprises:

supporting, on a film inflation platform located adjacent to the platen assembly, the film during insertion of the bladder pull tool; and the film inflation platform including a film storage rack containing at least one film material spool for forming a next tool-tube assembly from a next bladder pull tool inserted into another length of the film.

17. The method of claim 10, further comprising:

heating, using a heat shrink device, the film-sock-bladder assembly in a manner to shrink the film around bladder side surfaces of the bladder.

18. The method of claim 10, wherein receiving the wrap plies over the forming bed opening, and urging the wrap laminate into the forming bed opening comprises:

receiving the film-sock-bladder assembly and a bladder pull tool respectively on a bladder assembly end preparation platform and on the wrap ply forming bed after the film-sock-bladder assembly exits the film application station;

decoupling the bladder pull tool from the film-sock-bladder assembly;

transferring the bladder pull tool to a bladder pull tool storage rack located adjacent to the wrap ply forming bed;

dispensing, using a ply lamination head, one or more wrap plies of composite material over the forming bed opening to form the wrap laminate; and lifting the film-sock-bladder assembly off of the bladder assembly end preparation platform, and lowering the film-sock-bladder assembly on top of the wrap laminate for urging the wrap laminate and the film-sock-bladder assembly into the forming bed opening.

19. The method of claim 10, wherein urging the wrap laminate into the forming bed opening further comprises:

sequentially folding, using a first wrap ply folding plate and a second wrap ply folding plate, a first protruding portion and a second protruding portion of the wrap laminate over each other on top of the film-sock-bladder assembly to result in a wrap ply lap joint; and locally heating and tacking together, using a heating element of the second wrap ply folding plate, the first protruding portion and the second protruding portion at the wrap ply lap joint to produce the ply-film-sock-bladder assembly for installation in a stringer cavity of a composite stringer.

20. The method of claim 10, further comprising: activating a plurality of drive rollers for pulsing movement of at least one of the bladder and a bladder pull tool.

* * * * *